(12) United States Patent
Hagiwara et al.

(10) Patent No.: US 10,393,035 B2
(45) Date of Patent: Aug. 27, 2019

(54) ENGINE DEVICE

(71) Applicant: Yanmar Co., Ltd., Osaka-shi, Osaka-fu (JP)

(72) Inventors: Ryoichi Hagiwara, Osaka (JP); Masayoshi Doi, Osaka (JP); Taishi Murakami, Osaka (JP); Tatsuro Ohsara, Osaka (JP); Osamu Yamagishi, Osaka (JP)

(73) Assignee: YANMAR CO., LTD., Osaka (JP)

( * ) Notice: Subject to any disclaimer, the term of this patent is extended or adjusted under 35 U.S.C. 154(b) by 0 days.

(21) Appl. No.: 15/760,887

(22) PCT Filed: May 24, 2016

(86) PCT No.: PCT/JP2016/065255
§ 371 (c)(1),
(2) Date: Mar. 16, 2018

(87) PCT Pub. No.: WO2017/047162
PCT Pub. Date: Mar. 23, 2017

(65) Prior Publication Data
US 2019/0085773 A1    Mar. 21, 2019

(30) Foreign Application Priority Data

Sep. 16, 2015  (JP) ................................. 2015-182483

(51) Int. Cl.
*B63H 21/00* (2006.01)
*B63H 21/21* (2006.01)
(Continued)

(52) U.S. Cl.
CPC ......... *F02D 19/0647* (2013.01); *B63H 21/00* (2013.01); *B63H 21/21* (2013.01);
(Continued)

(58) Field of Classification Search
CPC ........ B63H 21/00; B63H 21/21; B63H 21/32; F02D 19/061; F02D 19/0615;
(Continued)

(56) References Cited

U.S. PATENT DOCUMENTS

2010/0332106 A1* 12/2010 Vanderslice ........ F02D 19/0631
701/103
2013/0325297 A1    12/2013 Masubuchi

FOREIGN PATENT DOCUMENTS

JP      1984-052054 U1    4/1984
JP      H08-004562 A      1/1996
(Continued)

OTHER PUBLICATIONS

International Search Report dated Aug. 30, 2016 issued in corresponding PCT Application PCT/JP2016/065255.

*Primary Examiner* — Brandon D Lee
(74) *Attorney, Agent, or Firm* — Norton Rose Fulbright US LLP

(57) ABSTRACT

An engine device including: an intake manifold configured to supply air into a cylinder; an exhaust manifold configured to output exhaust gas from the cylinder; a gas injector which mixes a gaseous fuel with the air supplied from the intake manifold; and a main fuel injection valve configured to inject a liquid fuel into the cylinder for combustion. At the time of switching the operation mode from one to the other between a gas mode and a diesel mode, an instant switching to the diesel mode is executed when the engine rotation number is determined to approach the upper limit value which leads to an emergency stop of the engine device.

6 Claims, 29 Drawing Sheets

(51) Int. Cl.
  *B63H 21/32* (2006.01)
  *F02D 19/06* (2006.01)
  *F02D 19/10* (2006.01)
  *F02D 31/00* (2006.01)
  *F02D 41/00* (2006.01)
  *F02D 41/30* (2006.01)
  *F02M 37/00* (2006.01)

(52) U.S. Cl.
  CPC ........... *B63H 21/32* (2013.01); *F02D 19/061* (2013.01); *F02D 19/0615* (2013.01); *F02D 19/0618* (2013.01); *F02D 19/0623* (2013.01); *F02D 19/0642* (2013.01); *F02D 19/0689* (2013.01); *F02D 19/0692* (2013.01); *F02D 19/0694* (2013.01); *F02D 19/105* (2013.01); *F02D 31/007* (2013.01); *F02D 31/009* (2013.01); *F02D 41/0025* (2013.01); *F02D 41/0027* (2013.01); *F02D 41/3064* (2013.01); *F02D 41/3094* (2013.01); *F02M 37/0064* (2013.01); *F02D 2200/101* (2013.01); *F02D 2200/1002* (2013.01); *Y02T 10/36* (2013.01)

(58) Field of Classification Search
  CPC ............. F02D 19/0618; F02D 19/0623; F02D 19/0642; F02D 19/0647; F02D 19/0689; F02D 19/0692; F02D 19/0694; F02D 19/105; F02D 31/007; F02D 31/009; F02D 41/0025; F02D 41/0027; F02D 41/3064; F02D 41/3094; F02D 2200/1002; F02D 2200/101; F02M 37/0064; Y02T 10/36
  See application file for complete search history.

(56) References Cited

FOREIGN PATENT DOCUMENTS

| | | |
|---|---|---|
| JP | 2000-145488 A | 5/2000 |
| JP | 2002-004899 A | 1/2002 |
| JP | 2003-065112 A1 | 3/2003 |
| JP | 2003-262139 A | 9/2003 |
| JP | 2004-108154 A | 4/2004 |
| WO | 2011/136005 A1 | 11/2011 |
| WO | 2012/111114 A1 | 8/2012 |
| WO | 2015-129547 A1 | 9/2015 |

* cited by examiner

ENGINE DEVICE

CROSS REFERENCES TO RELATED APPLICATIONS

This application is a national stage application pursuant to 35 U.S.C. § 371 of International Application No. PCT/JP2016/065255, filed on May 24, 2016, which claims priority under 35 U.S.C. § 119 to Japanese Patent Application No. 2015-182483, filed on Sep. 16, 2015, the disclosures of which are hereby incorporated by reference in their entireties.

TECHNICAL FIELD

The present invention relates to an engine device of a multi-fuel adoptable type for both gaseous fuels such as natural gas and liquid fuels such as heavy oil.

BACKGROUND ART

Traditionally, diesel engines are used as a drive source of vessels such as tankers or transport ships and onshore power generation facilities. However, the exhaust gas of the diesel engine contains a large amount of nitrogen oxides, sulfur oxides, particulate matter, and the like which are harmful substances hindering preservation of the environment. For this reason, in recent years, gas engines that can reduce the amount of harmful substances generated are becoming prevalent as an alternative engine for diesel engines.

A so-called gas engine that generates power by using a fuel gas such as natural gas supplies a mixed gas obtained by mixing a fuel gas with the air to a cylinder and combust the same (see Patent Literature 1; hereinafter PTL 1). Further, as an engine device combining the characteristics of a diesel engine and characteristics of a gas engine, there is a dual-fuel engine which allows a use of a premixed combustion mode in which a mixture of a gaseous fuel (fuel gas) such as natural gas and air is supplied to a combustion chamber and combusted, in combination with a diffusion combustion mode in which a liquid fuel such as crude oil is injected into the combustion chamber and combusted (see patent Literature 2; hereinafter, PTL 2).

Further, as a dual-fuel engine, a multifuel engine or a bi-fuel engine has been suggested which adjusts a gaseous fuel and a liquid fuel at a time of switching from a gas mode using the gaseous fuel to a diesel mode using the liquid fuel (see Patent Literature 3; hereinafter, referred to as PTL 3).

CITATION LIST

Patent Literature

PTL1: Japanese Patent Application Laid-Open No. 2003-262139
PTL 2: Japanese Patent Application Laid-Open No. 2002-004899
PTL 3: Japanese Patent Application Laid-Open No. H08-004562 (1996)

SUMMARY OF INVENTION

Technical Problem

When switching an operation mode in a dual-fuel engine, both a gaseous fuel and a liquid fuel are supplied in an overlapping manner, and the gaseous fuel and the liquid fuel are adjusted as in PTL 3. At this time, speed-governing control is performed for a supply amount of one of the gaseous fuel and the liquid fuel, and ramp functional (proportion functional) increase/decrease control is performed for the supply amount of the other, thereby adjusting the engine rotation number to a target rotation number.

However, in the traditional art, a threshold value which is a timing for switching between the speed-governing control and the increase/decrease control is often set constant based on the supply amount of one of the gaseous fuel and the liquid fuel. Thus, if the control of the fuel of a post-switching operation mode is changed to the speed-governing control, in a case where the engine device is driven at a high rotation number, a fuel supply amount largely fluctuates under the influence of load fluctuation and the engine rotation number of the engine device is rapidly fluctuated, due to a small fuel supply amount, which may consequently lead to sudden stop, in some cases. Further, if the control of the fuel of the post-switching operation mode is changed to speed-governing control, in a case where the engine device is driven at a low rotation number, the engine rotation number of the engine device may be an excessive number (overspeed) due to a large fuel supply amount.

In particular, when the load drops during the switching of the operation mode and when the fuel supply amount necessary for driving the engine drive is less than a supply amount of a fuel which does not play a role in speed governing (a fuel that varies in a ramp functional manner), the engine device cannot be speed-governed, thus resulting in the overspeed. The operation of the engine device in the overspeed state is determined as to be in a critical area, leading to an emergency stop.

Further, a large-size engine device for a ship, in particular, is required to operate in the diesel mode to sustain navigation of the ship in cases of emergency. However, when the gas mode is switched to the diesel mode in such an emergency, a traditional engine device may suspend its operation and stop the ship, due to abnormal combustion or an excessively high in-cylinder pressure caused by an excessive supply of the fuel into the cylinder, or due to misfire caused by insufficient fuel in the cylinder.

In view of the current circumstances described above, it is a technical object of the present invention to provide an improved engine device.

Solution to Problem

An aspect of the present invention is an engine device including: an intake manifold configured to supply air into a cylinder; an exhaust manifold configured to output exhaust gas from the cylinder; a gas injector which mixes a gaseous fuel with the air supplied from the intake manifold; and a main fuel injection valve configured to inject a liquid fuel into the cylinder for combustion, the gas injector and the main fuel injection valve being provided to each of a plurality of the cylinders, the engine device configured to drive in either a gas mode in which the gaseous fuel is supplied into the cylinder or a diesel mode in which the liquid fuel is supplied into the cylinder, wherein at a time of switching an operation mode from one to the other between the gas mode and the diesel mode, an instant switching to the diesel mode is executed when an engine rotation number is determined as to approach an upper limit value which leads to an emergency stop of the engine device.

The engine device may be such that, at the time of switching the operation mode, the instant switching to the diesel mode is executed when a measured engine rotation number exceeds a predetermined rotation number lower than an upper limit engine rotation number which leads to an emergency stop.

The engine device may be such that, at the time of switching the operation mode, the instant switching to the diesel mode is executed when a decrease amount in the engine load from a switching start time becomes larger than a predetermined amount.

The engine device may be such that, at the time of switching the operation mode, the instant switching to the diesel mode is executed when a ratio of a liquid fuel supply amount to a gaseous fuel supply amount becomes smaller than a predetermined value.

The above-described engine device may be such that, at a time of instantly switching from the gas mode to the diesel mode, a supply amount of a liquid fuel after the switch to the diesel mode is set based on the engine rotation number or the engine load, supply of the liquid fuel is started and supply of the gaseous fuel is stopped, and then the supply amount of the liquid fuel is controlled by the speed-governing control. The supply amount of the liquid fuel after an instant switching may be set to a small amount, when the engine rotation number or the engine load is low.

The above-described engine device may be such that, at a time of switching an operation mode from one to the other between the gas mode and the diesel mode, a supply amount of a first fuel to be supplied in a post-switching operation mode is increased to a switching threshold value through an increase control which monotonously increases the supply amount, and then controlled by a speed-governing control based on an engine rotation number; and the switching threshold value is set based on the engine rotation number or an engine load. Further, the switching threshold value may be set to a small value, when the engine rotation number or the engine load is low.

The engine device may be such that, at a time of switching the operation mode from one to the other between the gas mode and the diesel mode, a supply amount of a second fuel to be supplied in a pre-switching operation mode is controlled by the speed-governing control based on the engine rotation number, and after the supply amount of the first fuel reaches the switching threshold value through the increase control, the supply amount of the second fuel is decreased by a decrease control which monotonously decreases the supply amount. Supply of the second fuel may be stopped when the supply amount of the second fuel reaches a lower limit value by the decrease control.

Advantageous Effects of Invention

In the aspect of the present invention, at a time of switching an operation mode, an instant switching to the diesel mode is executed when the engine rotation number is determined as to approach an upper limit value which leads to an emergency stop of the engine device. Therefore, the operation mode of the engine device can be urgently switched to the diesel mode, depending on a fluctuation amount in the engine load. That is, at a time of switching the operation mode, it is possible to prevent the engine rotation number of the engine device from reaching the upper limit engine rotation number, even if the engine load largely fluctuates, and an emergency stop of the engine device can be avoided. Since the engine rotation number does not rise to a rotation number beyond the upper limit value (overspeed), a ship having this engine device mounted thereon can stably continue its navigation without an emergency stop of the ship.

In the aspect of the present invention, at a time of switching the operation mode, since the switching threshold value is set based on the engine rotation number or the engine load, the engine rotation number will not rise to a rotation number beyond an upper limit value (overspeed), during and operation with a low load or at a low rotation number, and good responsiveness to the load fluctuation is maintained during an operation with a high load or at a high rotation number. In cases where the engine device is operating with a low load or at a low rotation number, by setting the switching threshold value to a small value, the control of the fuel oil supply can be switched to the speed-governing control and the fuel gas supply can be stopped, without raising the engine rotation number to a target rotation number. Further, in cases where the engine device is operating with a high load or at a high rotation number, by setting the switching threshold value to a high value, the supply amount of fuel which significantly affects the engine rotation number is subjected to the speed-governing control. Therefore, for example, the engine rotation number can be kept nearby the target rotation number even when the load is rapidly decreasing, and the engine rotation number can be prevented from rising to an extend that leads to an emergency stop.

In the aspect of the present invention, since the liquid fuel supply amount is set according to the load or the rotation number of the engine device, the engine rotation number will not rise to a rotation number beyond the upper limit value (overspeed), during an operation with a low load or at a low rotation number, and good responsiveness to the load fluctuation is maintained during an operation with a high load or at a high rotation number. In cases where the engine device is operating with a low load or at a low rotation number, by setting the liquid fuel supply amount to a small value, the control of the liquid fuel supply can be instantly subjected to the speed-governing control and the gaseous fuel supply can be stopped, without raising the engine rotation number to the target rotation number. Further, in cases where the engine device is operating with a high load or at a high rotation number, by setting the liquid fuel supply amount to a high value, a drop in the engine rotation number due to insufficient fuel can be avoided, and the engine rotation number can be kept at the target rotation number even after the instant switching.

DESCRIPTION OF EMBODIMENTS

The following description is based on drawings showing an application of an embodiment embodying the present invention to a pair of propulsion/electric power generating mechanisms mounted in a ship having a two-engine two-shaft structure.

Figure 1:
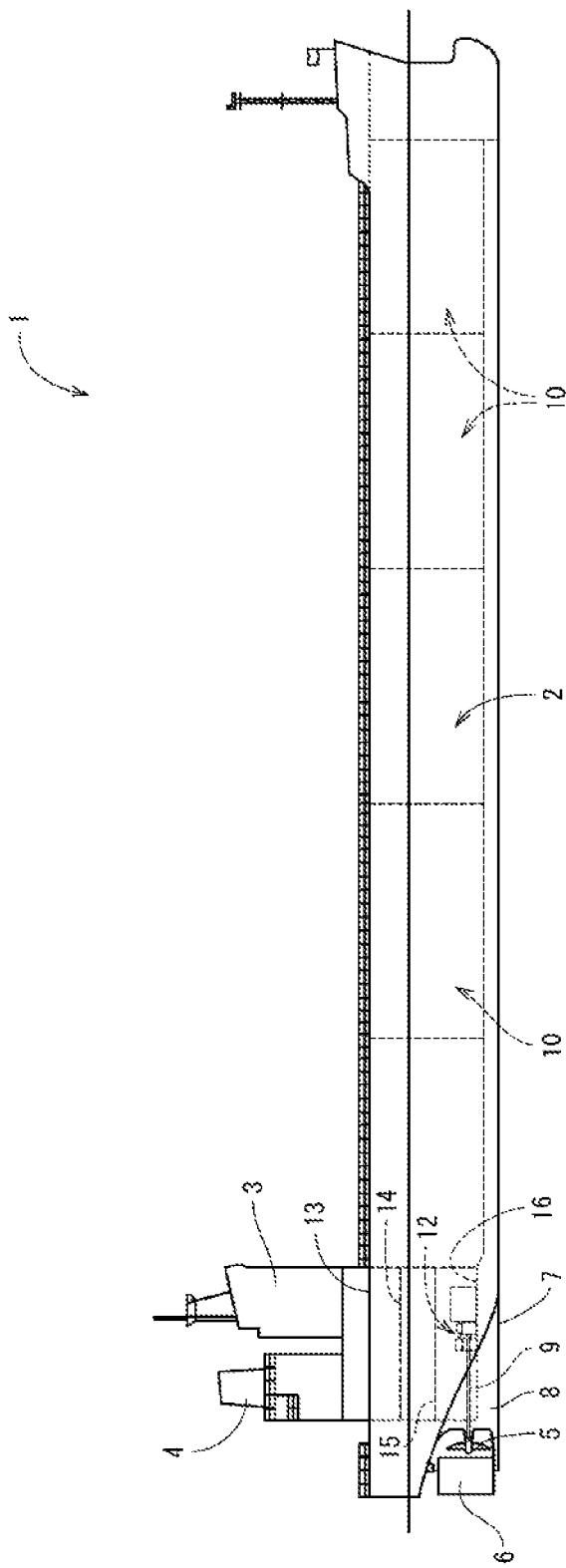
FIG. 1 An overall side view of a ship in an embodiment of the present invention.
Figure 2:
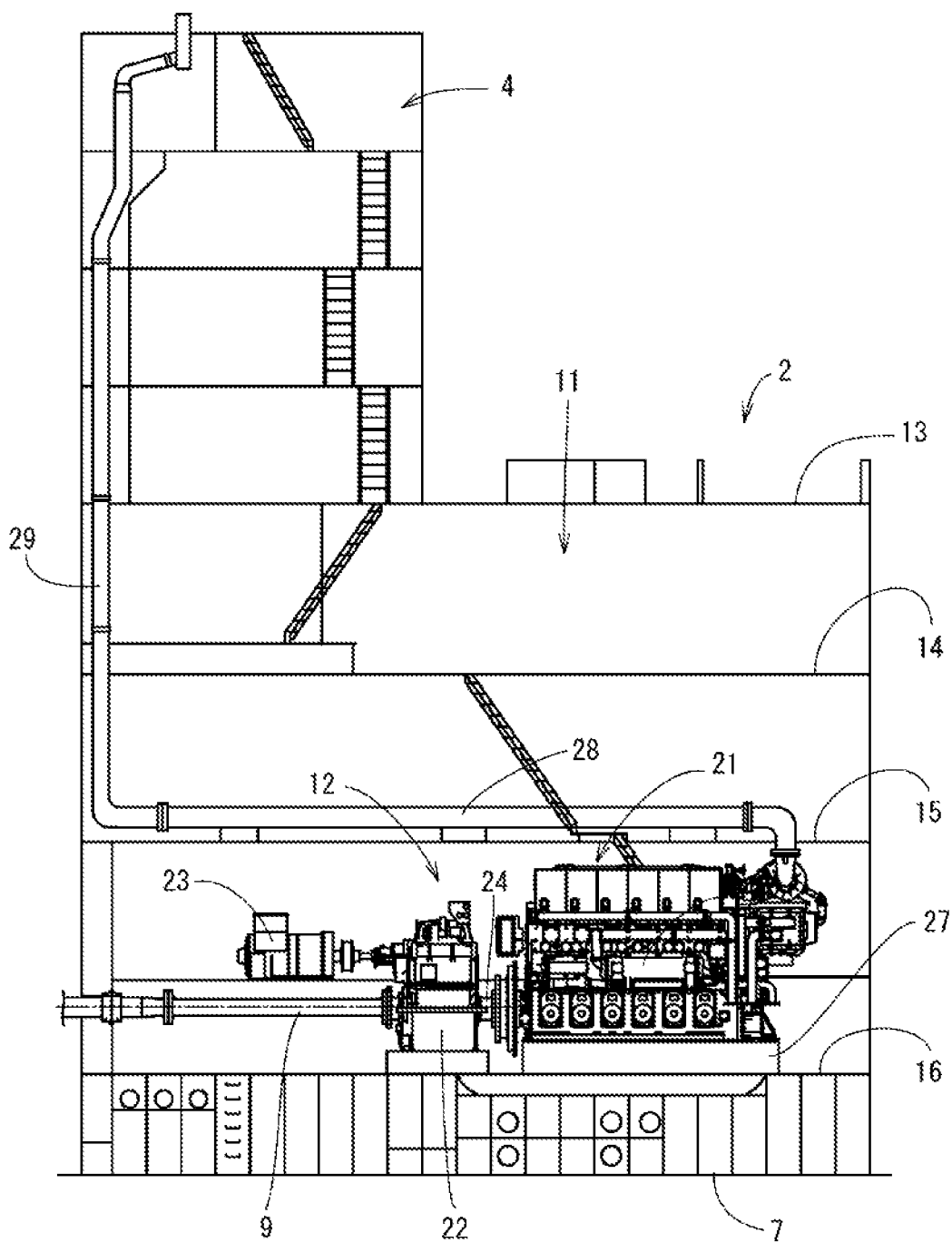
FIG. 2 A side cross sectional view of an engine room.
Figure 3:
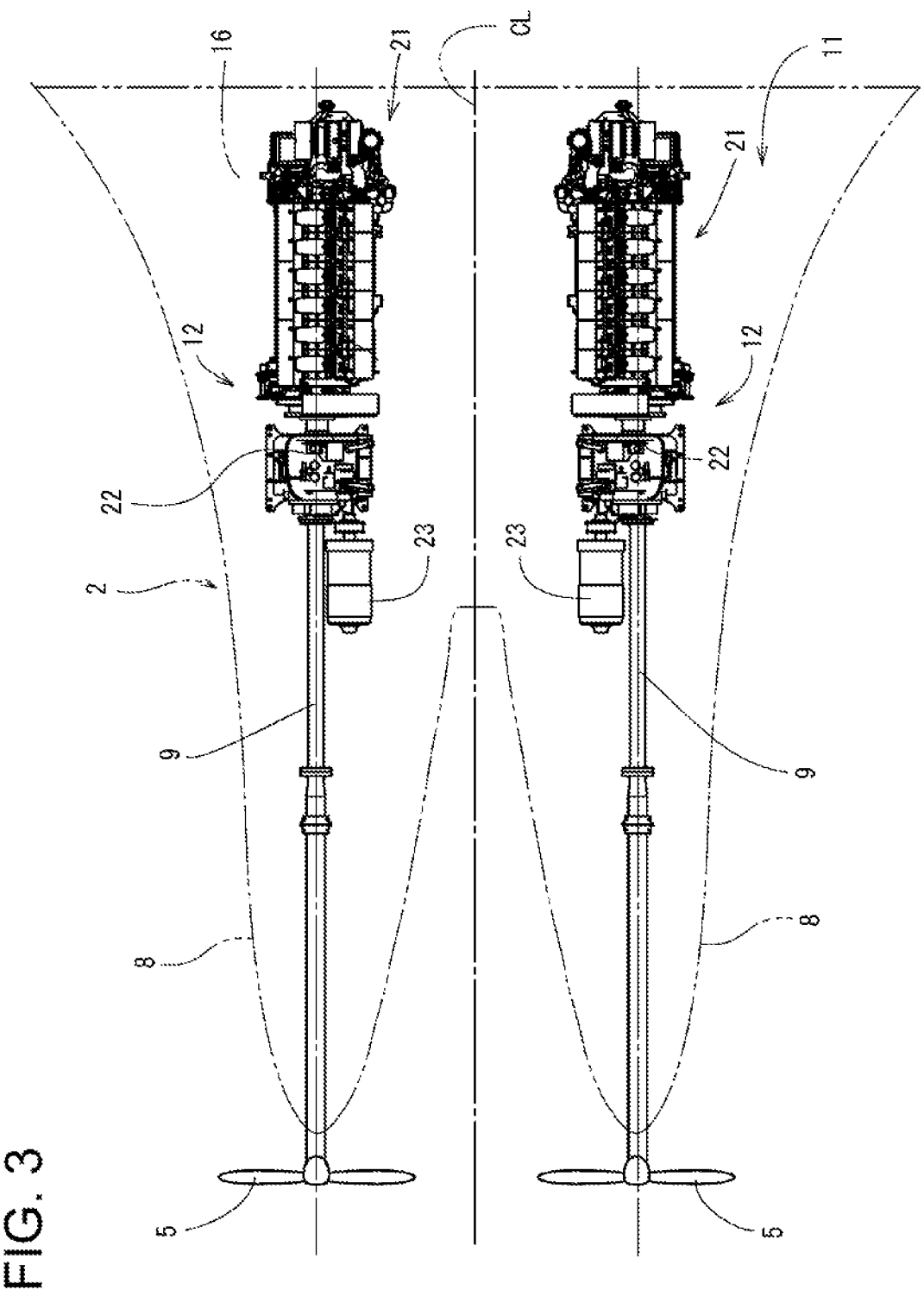
FIG. 3 An explanatory plan view of the engine room.

First, an overview of the ship is described. As shown in FIG. 1 to FIG. 3, the ship 1 of the present embodiment includes: a ship hull 2, a cabin 3 (bridge) provided on the stern side of the ship hull 2, a funnel 4 (chimney) positioned behind the cabin 3, and a pair of propellers 5 and a rudder 6 provided on a lower back portion of the ship hull 2. In this case, a pair of skegs 8 are integrally formed on the ship bottom 7 on the stern side. On each of the skegs 8, a propeller shaft 9 for driving to rotate the propeller 5 is pivotally supported. The skegs 8 are symmetrically formed on the left and right, with respect to the ship hull center line CL (see FIG. 3) which divides the lateral width direction of the ship hull 2. That is, the first embodiment adopts a twin skeg as the stern shape of the ship hull 2.

On a bow side and a middle part of the ship hull 2, a hold 10 is provided. On the stern side of the ship hull 2, an engine room 11 is provided. In the engine room 11, a pair of propulsion/electric power generating mechanisms 12 each serving as a drive source for propeller 5 and as an electric power supply of the ship 1 is positioned on the left and right across the ship hull center line CL. The rotary power transmitted from each propulsion/electric power generating mechanism 12 to the propeller shaft 9 drives and rotates the propeller 5. The inside of the engine room 11 is parted relative to the up and down directions, by an upper deck 13, a second deck 14, a third deck 15, and an inner bottom plate 16. The propulsion/electric power generating mechanisms 12 of the first embodiment are installed on the inner bottom plate 16 at the lower most stage of the engine room 11. It should be noted that, although details are not illustrated, the hold 10 is divided into a plurality of compartments.

As shown in FIG. 2 and FIG. 3, each propulsion/electric power generating mechanism 12 is a combination of: a medium-speed engine device 21 (dual-fuel engine, in the embodiment) which serves as a drive source of the propeller 5; a speed reducer 22 configured to transmit power of the engine device 21 to the propeller shaft 9; and a shaft-driven generator 23 which generates electric power by the power of the engine device 21. The term "medium-speed" engine herein means one that drives at a rotational speed of approximately 500 to 1000 times per minute. In this connection, a "low-speed" engine drives at a rotational speed of 500 times or less per minute, and a "high-speed" engine drives at a rotational speed of 1000 times or more per minute. The engine device 21 of the embodiment is configured to drive at a constant speed within a range of medium-speed (approximately 700 to 750 times per minute).

The engine device 21 includes: a cylinder block 25 having an engine output shaft (crank shaft) 24, and cylinder heads 26 mounted on the cylinder block 25. On the inner bottom plate 16 at the lower most stage of the engine room 11, a base mount 27 is mounted directly or through a vibration isolator (not shown). On this base mount 27, the cylinder block 25 of the engine device 21 is mounted. The engine output shaft 24 extends in the front/rear length direction of the ship hull 2. That is, the engine device 21 is arranged in the engine room 11 with the direction of the engine output shaft 24 directed in the front/rear length direction of the ship hull 2.

The speed reducer 22 and the shaft-driven generator 23 are disposed on the stern side of the engine device 21. From the rear surface side of the engine device 21, a rear end side of an engine output shaft 24 protrudes. On the rear end side of the engine output shaft, the speed reducer 22 is coupled in such a manner as to be capable of transmitting power. The shaft-driven generator 23 is arranged on the opposite side of the engine device 21 across the speed reducer 22. The engine device 21, the speed reducer 22, and the shaft-driven generator 23 are aligned in this order from the front of the engine room 11. In this case, the speed reducer 22 and the shaft-driven generator 23 are arranged in or nearby the skegs 8 on the stern side. Therefore, regardless of the limitation of the buttock line of the ship 1, it is possible to arrange the engine device 21 as close as possible to the stern side, contributing to the compactification of the engine room 11.

A propeller shaft 9 is provided on the downstream side of the power transmission of the speed reducer 22. The outer shape of the speed reducer 22 protrudes downward than the engine device 21 and the shaft-driven generator 23. To the rear surface side of this protruding portion, the front end side of the propeller shaft 9 is coupled so as to enable power transmission. The engine output shaft 24 (axial center line) and the propeller shaft 9 are coaxially positioned in plan view. The propeller shaft 9 extends in the front/rear length direction of the ship hull 2, while being shifted in the vertical direction from the engine output shaft 24 (axial center line). In this case, the propeller shaft 9 is located at a position lower than the shaft-driven generator 23 and the engine output shaft 24 (axial center line) in side view, and close to the inner bottom plate 16. In other words, the shaft-driven generator 23 and the propeller shaft 9 are sorted up and down and do not interfere with each other. Therefore, it is possible to make each propulsion/electric power generating mechanism 12 compact.

The constant speed power of the engine device 21 is branched and transmitted from the rear end side of the engine output shaft 24 to the shaft-driven generator 23 and the propeller shaft 9, via the speed reducer 22. A part of the constant speed power of the engine device 21 is reduced by the speed reducer 22 to, for example, a rotational speed of approximately 100 to 120 rotations per minute and is transmitted to the propeller shaft 9. The propeller 5 is driven and rotated by the speed-reduced power from the speed reducer 22. It should be noted that, as the propeller 5, a variable-pitch propeller capable of adjusting the ship speed through changing the blade angles of the propeller blades. A part of the constant speed power of the engine device 21 is reduced by the speed reducer 22 to, for example, a rotational speed of approximately 1200 to 1800 rotations per minute and is transmitted to the PTO shaft pivotally supported by the speed reducer 22. The rear end side of the PTO shaft of the speed reducer 22 is connected to the shaft-driven generator 23 in such manner as to be capable of transmitting the power, and the shaft-driven generator 23 is driven to generate electric power based on the rotary power from the speed reducer 22. Generated electric power by the shaft-driven generator 23 is supplied to electric system in the ship hull 2.

To the engine device 21, an intake path (not shown) for taking in the air and an exhaust path 28 for outputting exhaust gas are connected. The air taken in through the intake path is fed into cylinders 36 (into cylinders of air intake stroke) of the engine device 21. Further, since there are two engine devices 21, there are two exhaust paths 28. Each exhaust path 28 is connected to an extension path 29. The extension path 29 extends to the funnel 4, and is structured to be directly in communication with the outside. The exhaust gas from the engine device 21 is emitted outside the ship 1 through the exhaust path 28 and the extension path 29.

As should be understood from the above description, there is a pair of propulsion/electric power generating mechanisms 12 each of which is a combination of the engine device 21, the speed reducer 22 configured to transmit power from the engine device 21 to the propeller shaft 9 which drives and rotate propeller 5 for propelling the ship, and the shaft-driven generator 23 configured to generate electric power with the power from the engine device 21. The pair of propulsion/electric power generating mechanisms 12 are arranged and sorted on the left side of the ship hull center line CL, in the engine room 11 of the ship hull 2. Therefore, the space for setting up in the engine room 11 is downsized as compared with a traditional structure in which a plurality of engines (main engine and auxiliary engine) in an engine room. Therefore, the engine room 11 can be structured compact by shortening the front/rear length of the engine room 11, which in turn facilitates ensuring a hold space (space other than the engine room 11) in the ship hull 2. Two propellers 5 for driving can improve the propulsion efficiency of the ship 1.

Since there are two engine devices 21 which are each a main engine, for example, even when one of the engine devices 21 brakes down and cannot be driven, the other one of the engine devices 21 enables the navigation, and it is possible to ensure redundancy in the motor device of the ship and in turn the ship 1. Further, as is hereinabove mentioned, rotation drive of the propellers 5 and the drive of the shaft-driven generator 23 are possible with the engine devices 21, one of the shaft-driven generators 23 can be reserved as a spare during an ordinary cruise. Therefore, for example, if one engine device 21 or the shaft-driven generator 23 breaks down thus shutting down electric power supply, the power supply can be recovered by activating the other shaft-driven generator 23 and establishing the frequency and the voltage. Further, if the engine device 21 stops during the cruise with only that one engine device 21, the power supply can be recovered by activating the other engine device 21 having been stopped and in turn, the shaft-driven generator 23 corresponding to the other engine device 21 and establishing the frequency and the voltage.

Figure 4:
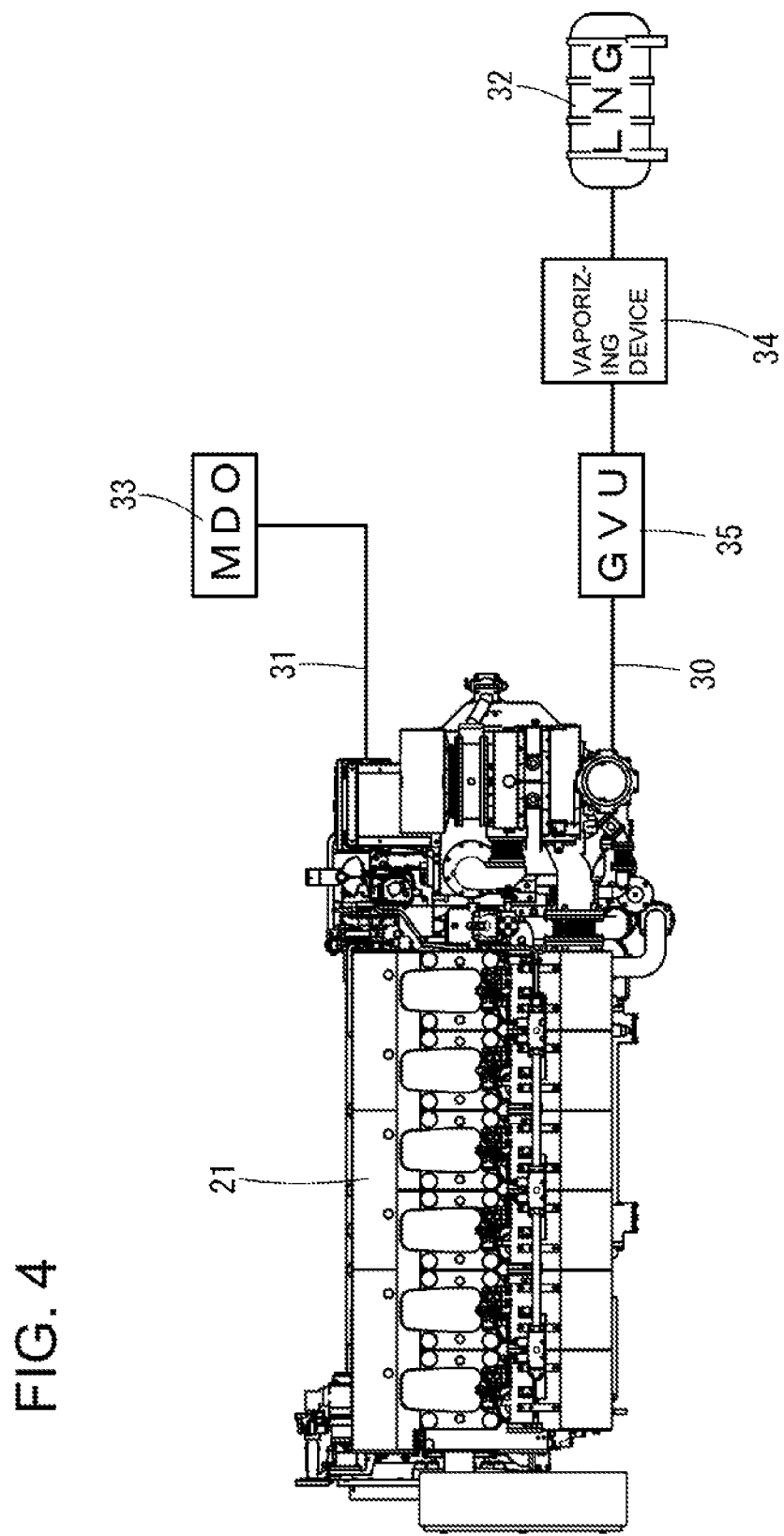
FIG. 4 A schematic view showing a structure of a fuel supply path of an engine device in the embodiment of the present invention.

Next, the following describes, with reference to FIG. 4 to FIG. 7, a schematic structure of the dual-fuel engine 21 used as the main engine in the above-described ship 1. The dual-fuel engine 21 (hereinafter, simply referred to as "engine device 21") is selectively driven in one of: a premixed combustion mode in which fuel gas such as natural gas is mixed and combusted with the air; and a diffusion combustion mode in which a liquid fuel (fuel oil) such as crude oil is diffused and combusted. FIG. 4 is a diagram showing a fuel system of the engine device 21. FIG.

Figure 7:
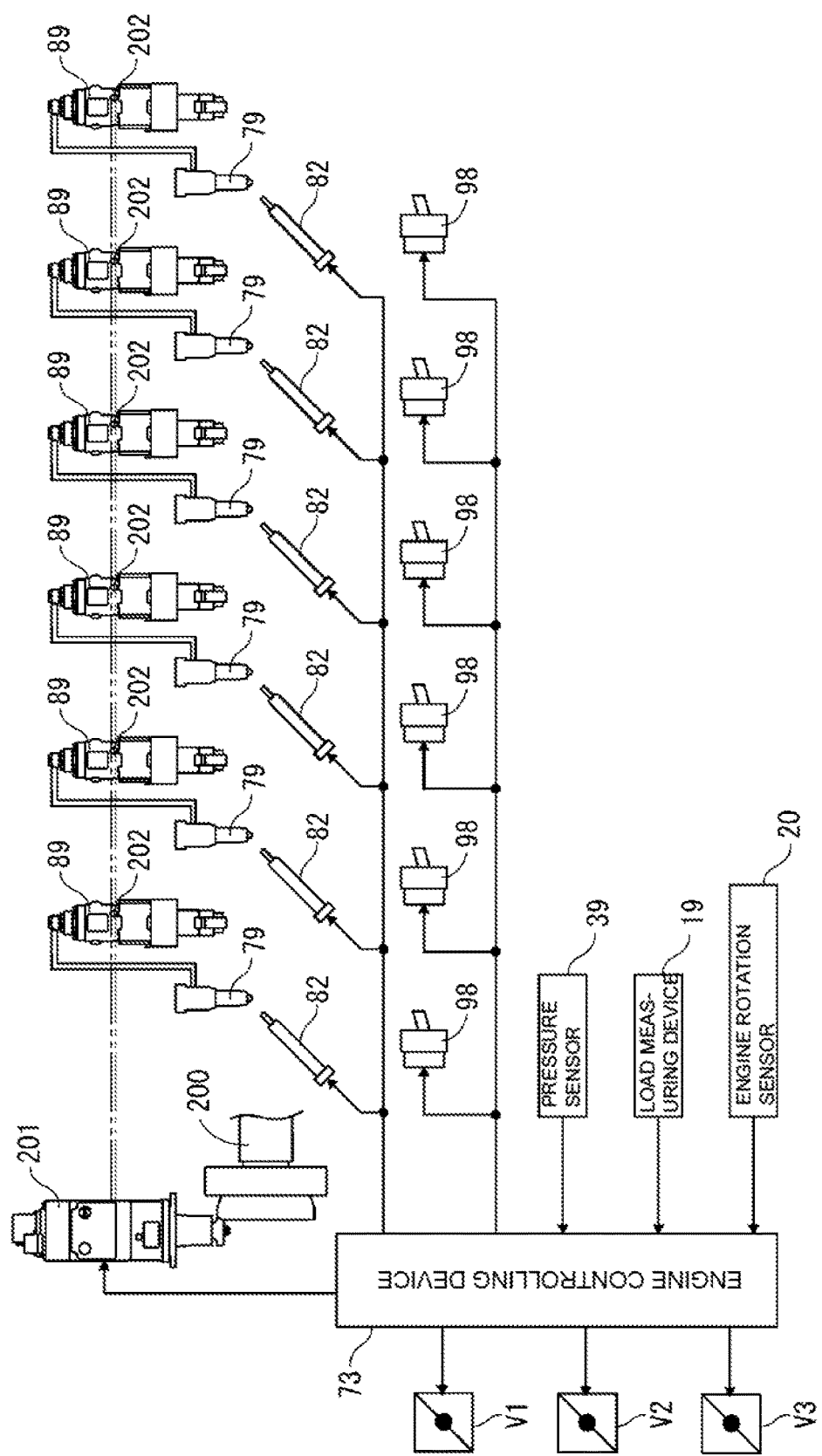
FIG. 7 A control block diagram of the engine device.

5 is a diagram showing an intake/exhaust system of the engine device 21. FIG. 7 is a control block diagram of the engine device 21.

As shown in FIG. 4, the engine device 21 is such that fuel is supplied from two systems of fuel supply paths 30, 31, and one of the fuel supply paths 30 is connected to a gas fuel tank 32, while the other one of the fuel supply paths 31 is connected to a liquid fuel tank 33. That is, the engine device 21 is structured so that the fuel gas is supplied from the fuel supply path 30 to the engine device 21, and that fuel oil is supplied to the engine device 21 from the fuel supply path 31. The fuel supply path 30 includes: a gas fuel tank 32 configured to store liquefied gaseous fuel; a vaporizing device 34 configured to vaporize the liquefied fuel (fuel gas) in the gas fuel tank 32; and a gas valve unit 35 configured to adjust a fuel gas supply amount from the vaporizing device 34 to the engine device 21. That is, in the structure of the fuel supply path 30, the vaporizing device 34 and the gas valve unit 35 are arranged in this order from the gas fuel tank 32 towards the engine device 21.

Figure 5:
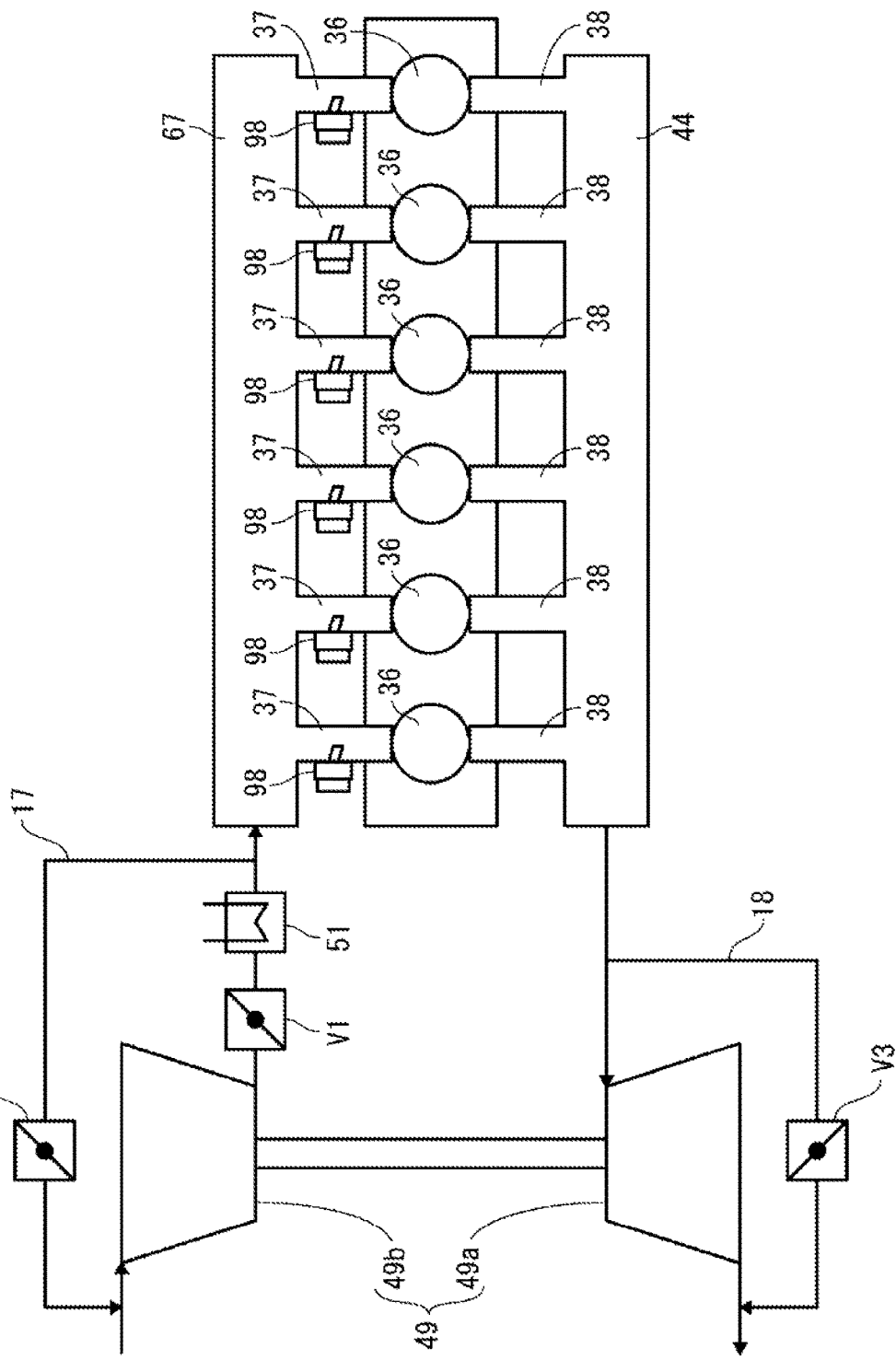
FIG. 5 A schematic view schematically illustrating the structure of an intake/exhaust passage in the engine device.

As shown in FIG. 5, the engine device 21 has a structure in which a plurality of cylinders 36 (6 cylinders in the present embodiment) are serially aligned in a later-described cylinder block 25. Each cylinder 36 is in communication with an intake manifold (intake passage) 67 structured in the cylinder block 25, through an intake port 37. Each cylinder 36 is in communication with an exhaust manifold (exhaust gas passage) 44 arranged above the cylinder heads 26, through an exhaust port 38. To the intake port 37 of each cylinder 36, a gas injector 98 is arranged. Therefore, while the air from the intake manifold 67 is supplied to each cylinder 36 through the intake port 37, the exhaust gas from each cylinder 36 is ejected to the exhaust manifold 44 through the exhaust port 38. Further, while the engine device 21 is operated in the gas mode, the fuel gas is supplied from the gas injector 98 to the intake port 37. The fuel gas is then mixed with the air from the intake manifold 67, and a premixed gas is supplied to each cylinder 36.

An exhaust gas outlet side of the exhaust manifold 44 is connected to an exhaust gas inlet of a turbine 49a of a turbocharger 49 is connected. An air inlet side (fresh air inlet side) of the intake manifold 67 is connected to an air ejection port (fresh air outlet) of an intercooler 51. An air inlet port (fresh air inlet) of the intercooler 51 is connected to the air ejection port (fresh air outlet) of a compressor 49b of the turbocharger 49. Between the compressor 49b and the intercooler 51, a main throttle valve V1 is arranged. By adjusting the valve opening degree of the main throttle valve V1, the flow rate of air to be supplied to the intake manifold 67 is adjusted.

A supplied-air bypass passage 17 configured to circulate a part of the air exhausted from the outlet of the compressor 49b to the inlet of the compressor 49b connects the air inlet port (fresh air inlet) side of the compressor 49b with the air outlet side of the intercooler 51. That is, the supplied-air bypass passage 17 is opened to the outside air on the upstream side of the air inlet port of the compressor 49b, while being connected to a connection part of the intercooler 51 and the intake manifold 67. On this supplied-air bypass passage 17, a supplied-air bypass valve V2 is arranged. By adjusting the valve opening degree of the supplied-air bypass valve V2, the flow rate of air from the downstream side of the intercooler 51 to the intake manifold 67 is adjusted.

The exhaust bypass passage 18 which bypasses the turbine 49a connects the exhaust gas outlet side of the turbine 49a and the exhaust gas outlet side of the exhaust manifold 44. That is, the exhaust bypass passage 18 is opened to the outside air on the downstream side of the exhaust gas outlet of the turbine 49a, while being connected to a connection part of the exhaust gas outlet of the turbine 49a and the exhaust gas inlet of the turbine 49a. On this exhaust bypass passage 18, an exhaust bypass valve V3 is arranged. By adjusting the valve opening degree of the exhaust bypass valve V3, the exhaust gas flow rate flowing in the turbine 49a, and adjust the air compression amount in the compressor 49b.

The engine device 21 includes: a turbocharger 49 configured to compress the air by the exhaust gas from the exhaust manifold 44; and an intercooler 51 configured to cool compressed air compressed by the turbocharger 49 and supply the compressed air to the intake manifold 67. In the engine device 21, the main throttle valve V1 is provided at the connecting portion between the outlet of the turbocharger 49 and the inlet of the intercooler 51. The engine device 21 includes an exhaust bypass passage 18 connecting an outlet of the exhaust manifold 44 and an exhaust gas outlet of the turbocharger 49, and an exhaust bypass valve V3 is arranged in the exhaust bypass passage 18. In cases of optimizing the turbocharger 49 for a diesel mode specification, an air-fuel ratio suitable for an engine load is achieved even in the gas mode, by controlling the opening degree of the exhaust bypass valve V3 according to fluctuation in the engine load. Therefore, shortage and surplus in the air amount necessary for combustion can be prevented at a time of load fluctuation, and the engine device 21 is suitably operated in the gas mode, even if the turbocharger optimized for the diesel mode is used.

The engine device 21 includes the supplied-air bypass passage 17 configured to bypass the turbocharger 49, and the supplied-air bypass valve V2 is arranged in the supplied-air bypass passage 17. By controlling the opening degree of the supplied-air bypass valve V2 according to fluctuation in the engine load, air that matches with the air-fuel ratio required for combustion of the fuel gas is supplied to the engine. Further, by performing in combination a control operation by the supplied-air bypass valve V2 with a good responsiveness, the response speed to the load fluctuation during the gas mode can be accelerated.

In the engine device 21, the supplied-air bypass passage 17 is connected in a position between the inlet of the intercooler 51 and the main throttle valve V1, the compressed air ejected from the compressor 49b is circulated to the inlet of the compressor 49b. This way, the responsiveness of the flow rate control by the exhaust bypass valve V3 is compensated by the supplied-air bypass valve V2, and the control band of the supplied-air bypass valve V2 is compensated by the exhaust bypass valve V3. Therefore, the followability of the air-fuel ratio control during the gas mode can be made favorable, when the load fluctuation takes place or at a time of switching the operation mode in a shipboard application.

Figure 6:
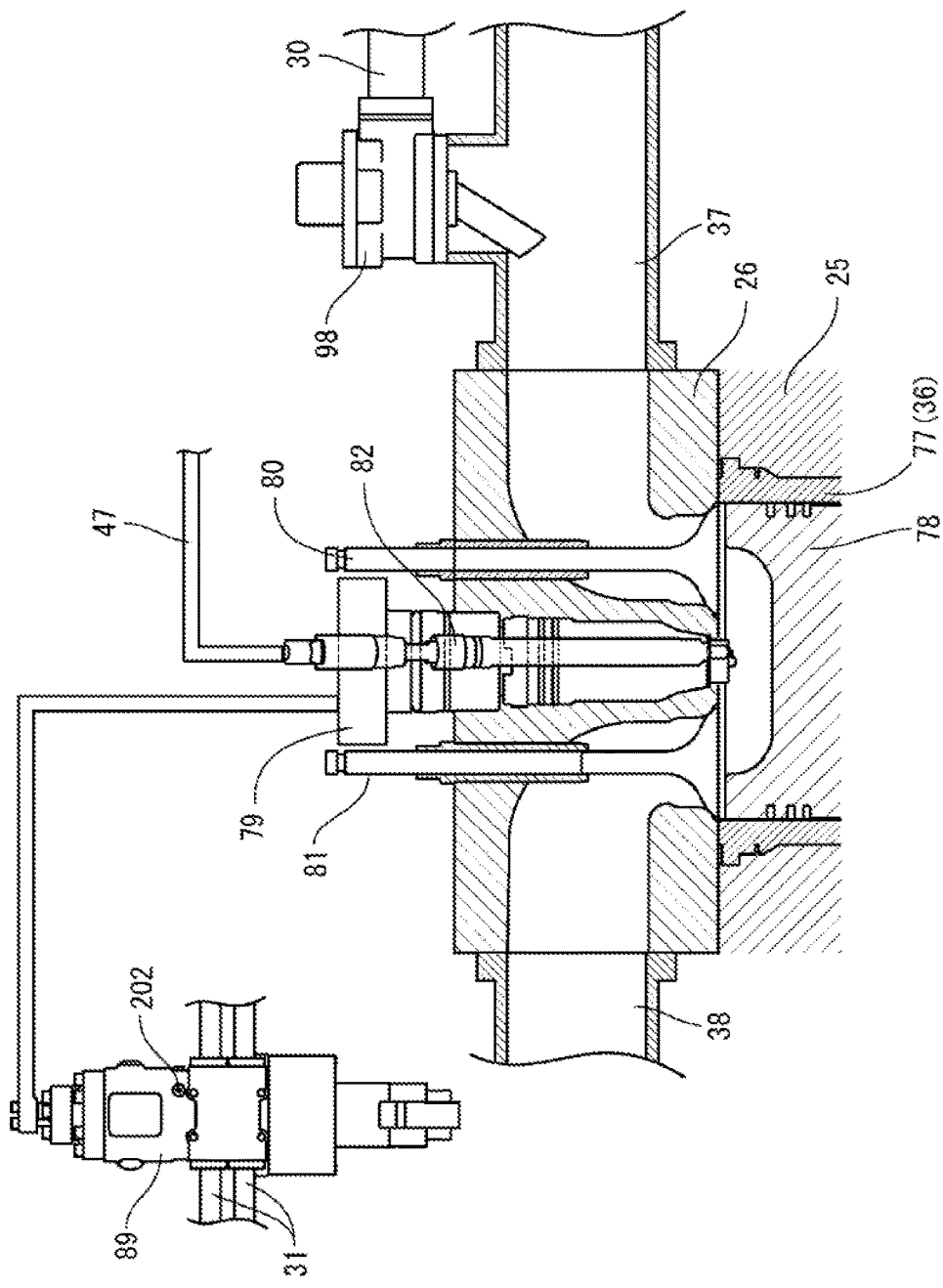
FIG. 6 A schematic view schematically illustrating the structure of the inside of a cylinder head in the engine device.

As shown in FIG. 6, in the engine device 21, a cylinder 77 (cylinder 36) having a cylindrical shape is inserted in the cylinder block 25. By having the piston 78 reciprocating in the up-down directions in the cylinder 77, the engine output shaft 24 on the lower side of the cylinder 77 is rotated. On each of the cylinder heads 26 on the cylinder block 25, a main fuel injection valve 79 which receives fuel oil (liquid fuel) from fuel oil pipes 42 has its leading end inserted into the cylinder 77. This fuel injection valve 79 has its leading end arranged in a center position on the upper end surface of the cylinder 77, and injects the fuel oil into the main combustion chamber structured by the upper surface of the piston 78 and the inner wall surface of the cylinder 77. Therefore, while the engine device 21 is driven in the diffusion combustion mode, the fuel oil is injected from the fuel injection valve 79 into the main combustion chamber in the cylinder 77, and reacts with the compressed air to cause diffusion combustion.

In each cylinder head 26, an intake valve 80 and an exhaust valve 81 are installed on the outer circumference side of the main fuel injection valve 79. When the intake valve 80 opens, the air from the intake manifold 67 is taken into the main chamber in the cylinder 77. On the other hand, when the exhaust valve 81 opens, the combustion gas (exhaust gas) in the main combustion chamber in the cylinder 77 is exhausted to the exhaust manifold 44. By having a push rod (not shown) reciprocating up and down according to the rotation of the cam shaft (not shown), the locker arm (not shown) swings to reciprocate the intake valve 80 and the exhaust valve 81 in the up and down.

A pilot fuel injection valve 82 that generates ignition flames in the main combustion chamber is obliquely inserted with respect to the cylinder head 26 so its leading end is arranged nearby the leading end of the main fuel injection valve 79. The pilot fuel injection valve 82 adopts a micro pilot injection method and has, on its leading end, a sub chamber from which pilot fuel is injected. That is, in the pilot fuel injection valve 82, the pilot fuel supplied from the common-rail 47 is injected into the sub chamber and combusted, to generate ignition flame in the center position of the main combustion chamber in the cylinder 77. Therefore, while the engine device 21 is driven in the premixed combustion mode, the ignition flame generated by the pilot fuel injection valve 82 causes reaction of a premixed gas which is supplied in the main combustion chamber of the cylinder 77 through the intake valve 80, thus leading to premixed combustion.

As shown in FIG. 7, the engine device 21 has an engine controlling device 73 configured to control each part of the engine device 21. In the engine device 21, the pilot fuel injection valve 82, a combustion injection pump 89, and a gas injector 98 are provided for each cylinder 36. The engine controlling device 73 provides control signals to the pilot fuel injection valve 82, the combustion injection pump 89, and the gas injector 98 to control injection of pilot fuel by the pilot fuel injection valve 82, fuel oil supply by the fuel injection valve 89, and gas fuel supply by the gas injector 98.

As shown in FIG. 7, the engine device 21 includes a cam shaft 200 having, for each cylinder 36, an exhaust cam, an intake cam, and a fuel cam not shown). The cam shaft 200 rotates the exhaust cam, the intake cam, and the fuel cam with rotary power transmitted from the crank shaft 24 through a gear mechanism (not shown) to open and close the intake valve 80 and the exhaust valve 81 of each cylinder 36 and to drive the fuel injection pump 89. The engine device 21 includes a speed adjuster 201 configured to adjust a rack position of a control rack 202 in the fuel injection pump 89. The speed adjuster 201 measures the engine rotation number of the engine device 21 based on the rotation number of the leading end of the cam shaft 200, to set the rack position of the control rack 202 in the fuel injection pump 89, thereby adjusting the fuel injection amount.

The engine controlling device 73 provides control signals to the main throttle valve V1 and the supplied-air bypass valve V2, and the exhaust bypass valve V3 to adjust their valve opening degrees, thereby adjusting the air pressure (intake manifold pressure) in the intake manifold 67. The engine controlling device 73 detects the intake manifold pressure based on a measurement signal from the pressure sensor 39 configured to measure the air pressure in the intake manifold 67. The engine controlling device 73 calculates the load imposed on the engine device 21, based on a measurement signal from a load measuring device 19 such as a watt transducer and a torque sensor. The engine controlling device 73 detects the engine rotation number of the engine device 21, based on a measurement signal from an engine rotation sensor 20 such as a pulse sensor configured to measure the rotation number of the crank shaft 24.

When the engine device 21 is operated in the diesel mode, the engine controlling device 73 controls opening and closing of the control valve in the fuel injection pump 89, and causes combustion in each cylinder 36 at a predetermined timing. That is, by opening the control valve of the fuel injection pump 89 according to an injection timing of each cylinder 36, the fuel oil is injected into the cylinder 36 through the main fuel injection valve 79, and ignited in the cylinder 36. Further, in the diesel mode, the engine controlling device 73 stops supply of the pilot fuel and the fuel gas.

In the diesel mode, the engine controlling device 73 performs feedback control for an injection timing of the main fuel injection valve 79 in the cylinder 36, based on the engine load (engine output) measured by the load measuring device 19 and the engine rotation number measured by the engine rotation sensor 20. This way, the engine 21 outputs an engine load needed by propulsion/electric power generating mechanism 12 and rotates at an engine rotation number according to the propulsion speed of the ship. Further, the engine controlling device 73 controls the opening degree of the main throttle valve V1 based on the intake manifold pressure measured by the pressure sensor 39, so as to supply compressed air from the turbocharger 49 to the intake manifold 67, at an air flow rate according to the required engine output.

While the engine device 21 is operated in the gas mode, the engine controlling device 73 adjusts the valve opening degree in the gas injector 98 to set the flow rate of fuel gas supplied to each cylinder 36. Then, the engine controlling device 73 controls opening and closing of the pilot fuel injection valve 82 to cause combustion in each cylinder 36 at a predetermined timing. That is, the gas injector 98 supplies the fuel gas to the intake port 37, at a flow rate based on the valve opening degree, mix the fuel gas with the air from the intake manifold 67, and supplies the premixed fuel to the cylinder 36. Then, the control valve of the pilot fuel injection valve 82 is opened according to the injection timing of each cylinder 36, thereby generating an ignition source by the pilot fuel and ignite in the cylinder 36 to which the premixed gas is supplied. Further, in the gas mode, the engine controlling device 73 stops supply of the fuel oil.

In the gas mode, the engine controlling device 73 performs feedback control for the fuel gas flow rate by the gas injector 98 and for an injection timing of the pilot fuel injection valve 82 in the cylinder 36, based on the engine load measured by the load measuring device 19 and the engine rotation number measured by the engine rotation sensor 20. Further, the engine controlling device 73 adjusts the opening degrees of the main throttle valve V1, the supplied-air bypass valve V2, and the exhaust bypass valve V3, based on the intake manifold pressure measured by the pressure sensor 39. This way, the intake manifold pressure is adjusted to a pressure according to the required engine output, and the air-fuel ratio of the fuel gas supplied from the gas injector 98 can be adjusted to a value according to the engine output.

Figure 8:
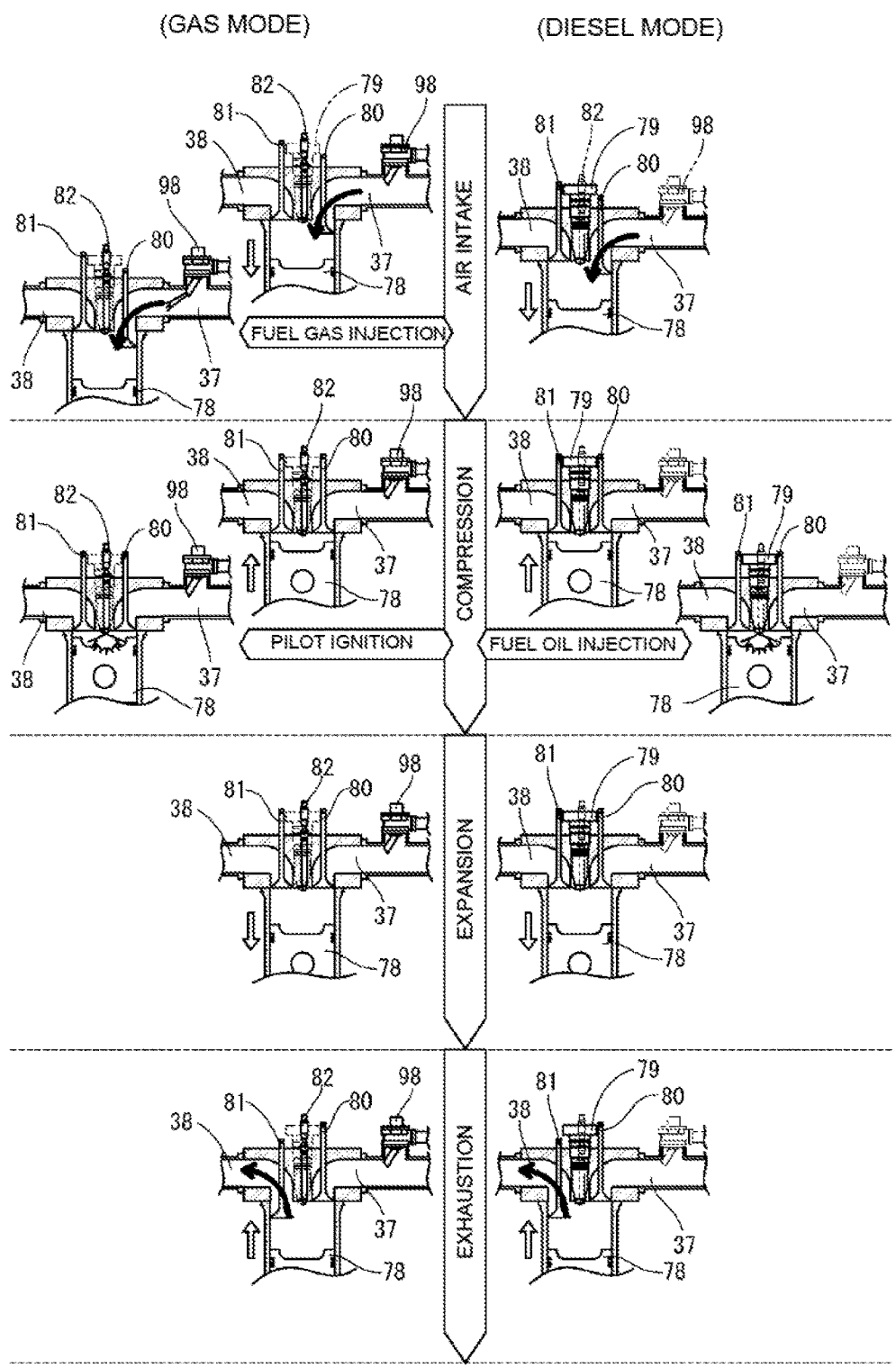
FIG. 8 An explanatory diagram showing an operation in the cylinder, in each of a gas mode and a diesel mode.
Figure 9:
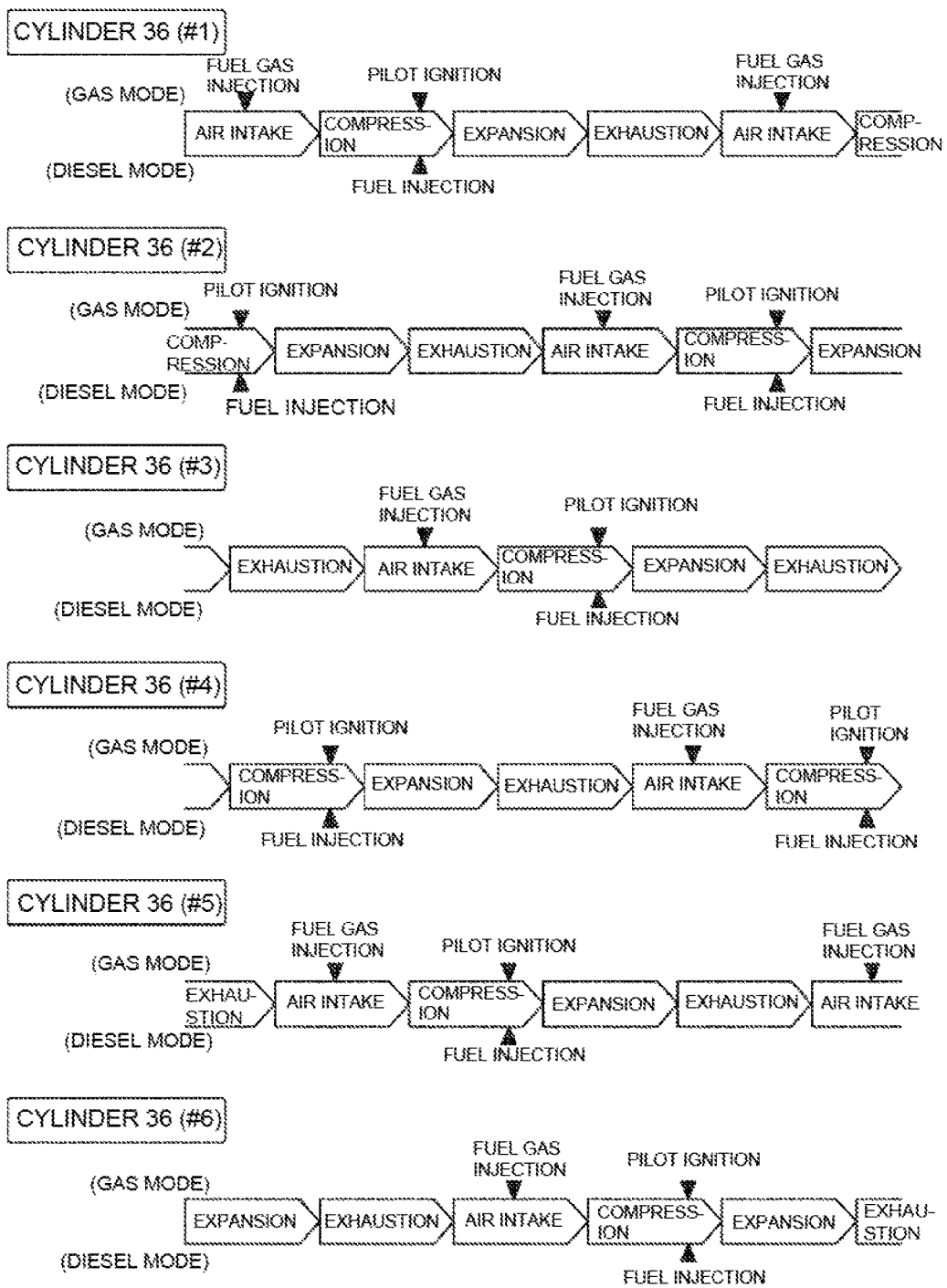
FIG. 9 A state transition diagram showing operation states of each cylinder in the engine device structured by six gas columns.

As shown in FIG. 8 and FIG. 9, in the engine device 21, the air intake valve 80 opens as the piston 78 drop in the cylinder 77, and the air from the intake manifold 67 flows into the cylinder 77 through the intake port 37 (air intake stroke). At this time, in the gas mode, the fuel gas is supplied from the gas injector 98 to the intake port 37. The fuel gas is then mixed with the air from the intake manifold 67, and a premixed gas is supplied to each cylinder 77.

Next, as shown in FIG. 8 and FIG. 9, in the engine device 21, the intake valve 80 closes as the piston 78 rises, thereby compressing the air in the cylinder 77 (compressing stroke). At this time, in the gas mode, when the piston 78 rises to the vicinity of the top dead point, an ignition flame is generated by the pilot fuel injection valve 82, to combust the premixed gas in the cylinder 77. In the diesel mode on the other hand, by opening the control valve of the fuel injection pump 89, the fuel oil is injected into the cylinder 77 through the main fuel injection valve 79, and ignited in the cylinder 77.

Next, as shown in FIG. 8 and FIG. 9, in the engine device 21, the combustion gas (exhaust gas produced by combusting reaction) in the cylinder 77 expands due to the combustion, thus causing the piston 78 to drop (expansion stroke). After that, the piston 78 rises and the exhaust valve 81 opens at the same time. Then, the combustion gas (exhaust gas) in the cylinder 77 is exhausted to the exhaust manifold 44 through the exhaust port 38 (exhaust stroke).

As shown in FIG. 5, the engine device 21 of the present embodiment includes six cylinders 36 (cylinders 77). The state of each cylinder 36 transits in an order of the air intake stroke, the compressing stroke, the expansion stroke, and the exhaust stroke shown in FIG. 8, at timings determined for each cylinder 36. That is, state transitions to each of the air intake stroke, the compressing stroke, the expansion stroke, and the exhaust stroke sequentially take place in the six cylinders 36 (#1 to #6), in an order of #1→#5→#3→#6→#2→#4, as shown in FIG. 9. Thus, while the engine device 21 operates in the gas mode, fuel gas injection from the gas injector 98 in the air intake stroke and ignition by the pilot fuel injection valve 82 in the compressing stroke are performed in an order of #1→#5→#3→#6→#2→#4. Similarly, while the engine device 21 operates in the diesel mode, fuel oil injection from the main fuel injection valve 79 in the compressing stroke are performed in an order of #1→#5→#3→#6→#2→#4.

Figure 10:
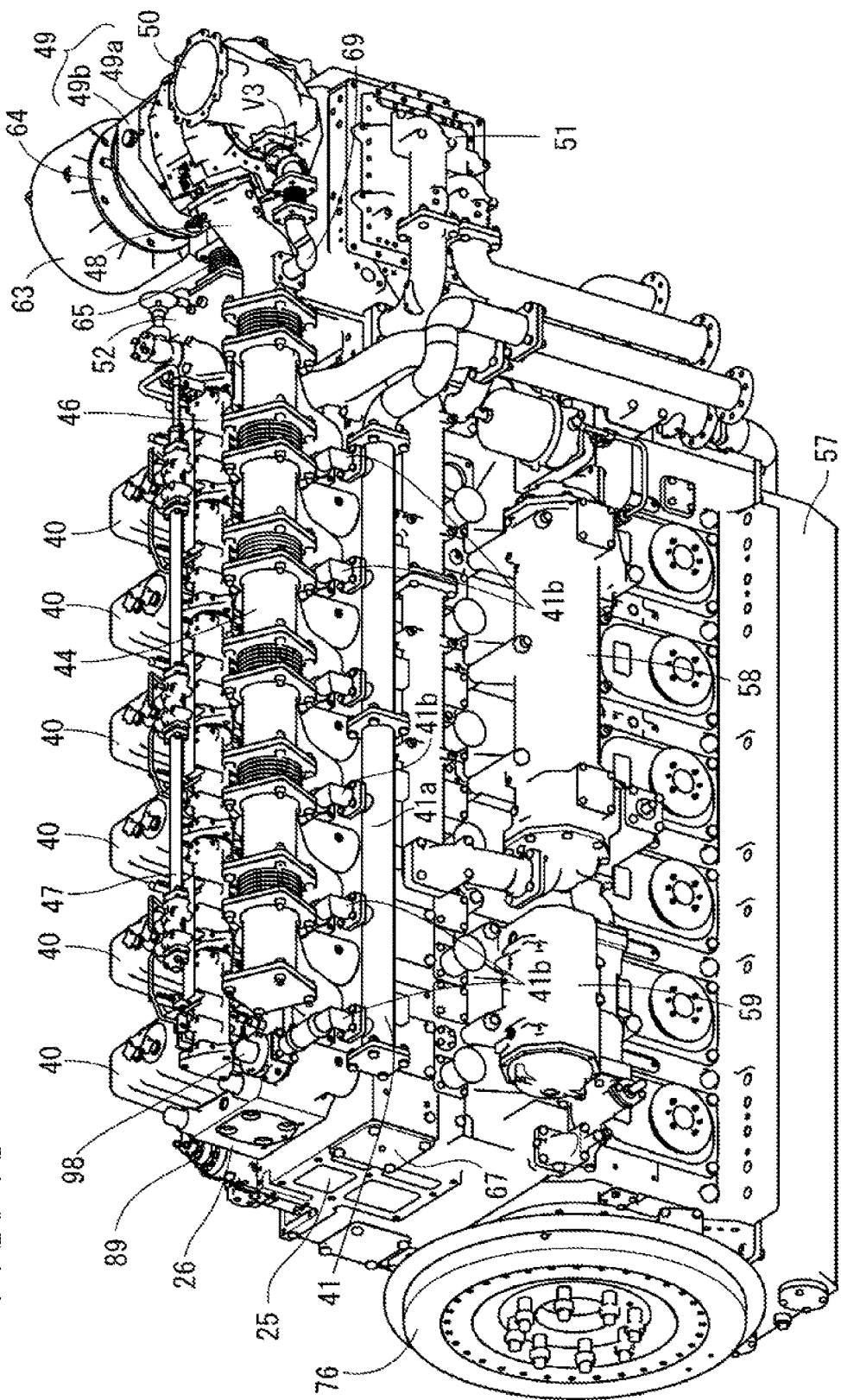
FIG. 10 A perspective view showing a side (right side face) of the engine device of the embodiment of the present invention, on which side an exhaust manifold is installed.
Figure 11:
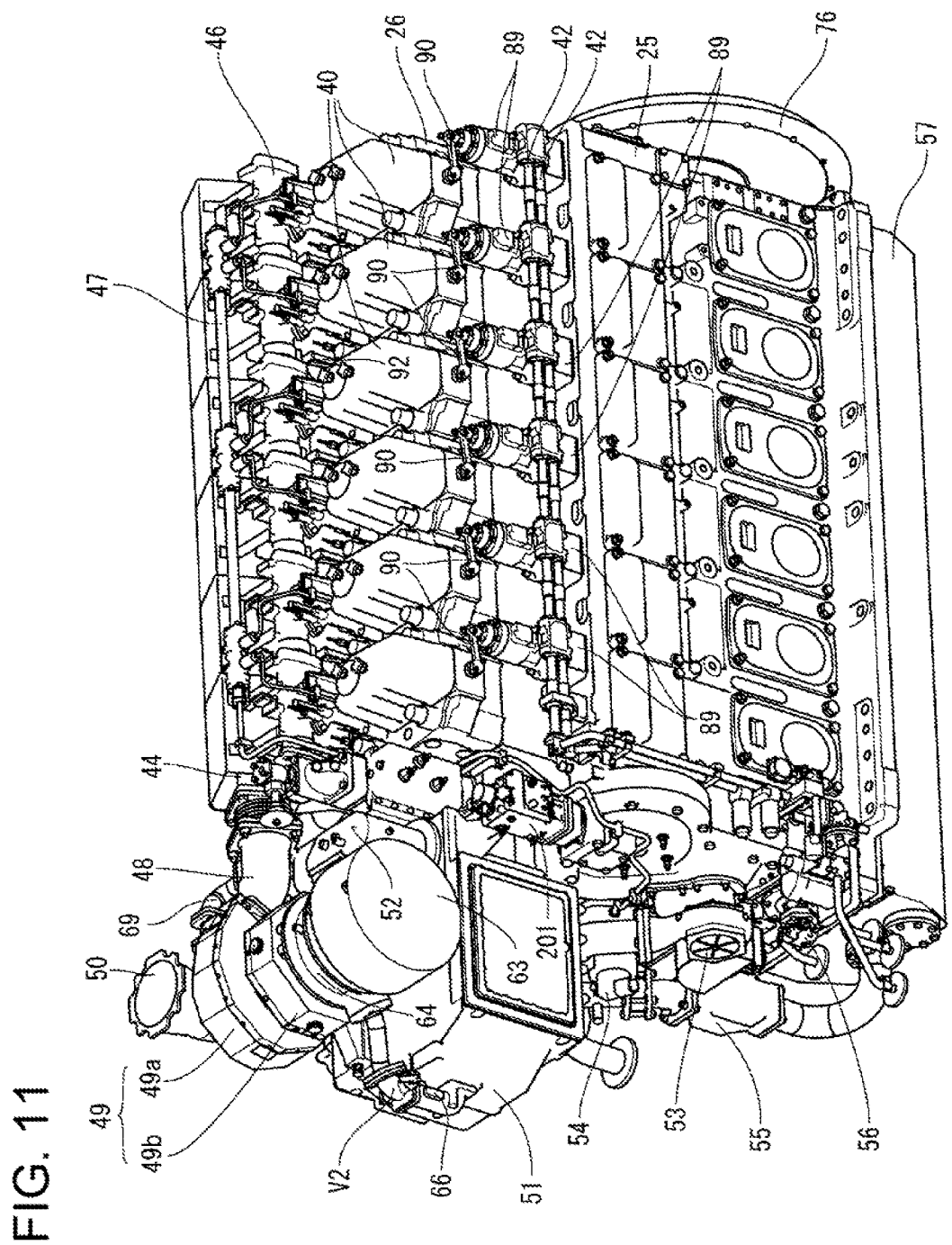
FIG. 11 A perspective view showing a side (right side face) of the engine device, on which side a fuel injection pump is installed.
Figure 12:
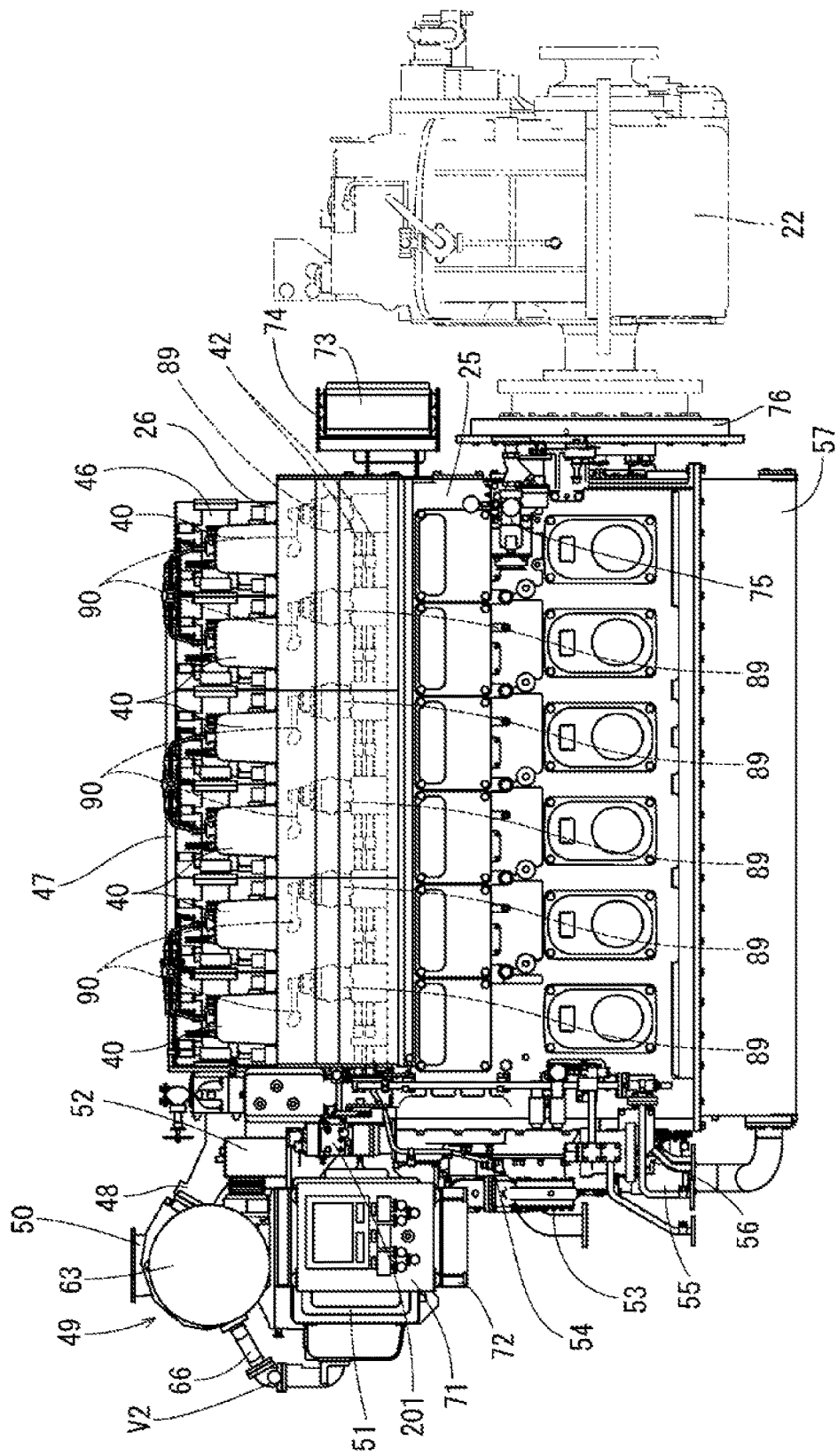
FIG. 12 A left side view of the engine device.

Next, the following details the structure of the dual-fuel engine 21 (engine device 21) having the above schematic structure, with reference to FIG. 10 to FIG. 12. In the following description, the positional relationship of the front, rear, left, and right in the structure of the engine device 21 are designated with the side connecting to the speed reducer 22 as the rear side.

As shown in FIG. 10 to FIG. 12, the engine device 21 has the cylinder heads 26 having a plurality of head covers 40 aligned in a single array in the front-rear direction, on the cylinder block 25 arranged on the base mount 27 (see FIG. 2). The engine device 21 has a gas manifold (gaseous fuel pipe) 41 extended in parallel to the array of the head covers 40, on the right side faces of the cylinder heads 26, and fuel oil pipes (liquid fuel pipes) 42 extended in parallel to the array of the head covers 40, on the left side face of the cylinder block 25. Further, on the upper side of the gas manifold 41, the later-described exhaust manifold (exhaust gas passage) 44 extends parallel to the array of the head covers 40.

Between the array of the head covers 40 and the exhaust manifold 44, an on-cylinder head cooling water pipe 46 connecting to a cooling water passage in the cylinder heads 26 is extended in parallel to the array of the head covers 40. On the upper side of the cooling water pipe 46, a common-rail (pilot fuel pipe) 47 configured to supply a pilot fuel such as light oil is extended in parallel to the array of the head covers 40, similarly to the cooling water pipe 46. At this time, the cooling water pipe 46 is connected to and supported by the cylinder heads 26, and the common-rail 47 is connected to and supported by the cooling water pipe 46.

The front end of the exhaust manifold 44 (exhaust gas outlet side) is connected to the turbocharger 49 through the exhaust gas relay pipe 48. Therefore, exhaust gas exhausted through the exhaust manifold 44 flows into the turbine 49a of the turbocharger 49 through the exhaust gas relay pipe 48, thus rotating the turbine 49a and rotating the compressor 49b on the same shaft as the turbine 49a. The turbocharger 49 is arranged on the upper side of the front end of the engine device 21, and has the turbine 49a on its right side, and the compressor 49b on the left side. An exhaust gas outlet pipe 50 is arranged on the right side of the turbocharger 49, and is connected to the exhaust gas outlet of the turbine 49a, to output exhaust gas from the turbine 49a to the exhaust path 28 (see FIG. 2).

On the lower side of the turbocharger 49, an intercooler 51 that cools down a compressed air from the compressor 49b of the turbocharger 49 is arranged. That is, on the front end side of the cylinder block 25, the intercooler 51 is installed, and the turbocharger 49 is placed in the upper part of the intercooler 51. In the laterally middle layer position of the turbocharger 49, the air ejection port of the compressor 49b is provided so as to be open rearwards (towards the cylinder block 25). On the other hand, on the top surface of the intercooler 51, an air inlet port is provided which opens upward, and through this air inlet port, compressed air ejected from the compressor 49b flows into the intercooler 51. The air ejection port of the compressor 49b and the air inlet port of the intercooler 51 are in communication with each other through an intake relay pipe 52 two which one ends of the ports are connected. The intake relay pipe 52 has the above-described main throttle valve V1 (see FIG. 5).

On the front end surface (front surface) of the engine device 21, a cooling water pump 53, a pilot fuel pump 54, a lubricating oil pump (priming pump) 55, and a fuel oil pump 56 are installed on the outer circumference side of the engine output shaft 24. The cooling water pump 53 and the fuel oil pump 56 are arranged up and down close to the left side face, respectively, and the pilot fuel pump 54 and the lubricating oil pump 55 are arranged up and down close to the right side face, respectively. Further, in the front end portion of the engine device 21, a rotation transmitting mechanism (not shown) configured to transmit rotary power of the engine output shaft 24. This way, the rotary power from the engine output shaft 24 is transmitted through the rotation transmitting mechanism to rotate the cooling water pump 53, the pilot fuel pump 54, the lubricating oil pump 55, and the fuel oil pump 56 provided on the outer circumference of the engine output shaft 24. Further, in the cylinder block 25, a cam shaft (not shown) whose axial direction is in the front-rear direction is pivotally supported on the upper side of the cooling water pump 53, and the cam shaft also rotated by the rotary power of the engine output shaft 24 transmitted through the rotation transmitting mechanism.

On the lower side of the cylinder block 25, an oil pan 57 is provided, and the lubricating oil that flows in the cylinder block 25 is accumulated in this oil pan 57. The lubricating oil pump 55 is connected to a suction port at the lower side of the oil pan 57 via the lubricating oil pipe, and sucks the lubricating oil accumulated in the oil pan 57. Further, the lubricating oil pump 55 has its ejection port on the upper side connected to the lubricating oil inlet of a lubricating oil cooler 58 through the lubricating oil pipe so as to supply the lubricating oil sucked from the oil pan 57 to the lubricating oil cooler 58. The front and the rear of the lubricating oil cooler 58 serve as the lubricating oil inlet and the lubricating oil outlet, respectively, and the lubricating oil outlet is connected to a lubricating oil strainer 59 through a lubricating oil pipe. The front and the rear of the lubricating oil strainer 59 serve as the lubricating oil inlet and the lubricating oil outlet, respectively, and the lubricating oil outlet is connected to the cylinder block 25. Thus, the lubricating oil fed from the lubricating oil pump 55 is cooled in the lubricating oil cooler 58, and then purified by the lubricating oil strainer 59.

The turbocharger 49 pivotally supports, on the same shaft, the compressor 49*b* and the turbine 49*a* arranged on the left and right. Based on rotation of the turbine 49*a* introduced from the exhaust manifold 44 through the exhaust gas relay pipe 48, the compressor 49*b* is rotated. Further, the turbocharger 49 has, on the left side of the compressor 49*b* serving as fresh air intake side, an intake filter 63 which removes dust from outside air introduced and a fresh air passage pipe 64 connecting the intake filter 63 and the compressor 49*b*. By having the compressor 49*b* rotate in sync with the turbine 49*a*, the outside air (air) taken in to the intake filter 63 is introduced into the compressor 49*b* through the turbocharger 49. The compressor 49*b* then compresses the air taken in from the left side and ejects the compressed air to the intake relay pipe 52 installed on the rear side.

The intake relay pipe 52 has its upper front portion opened and connected to the ejection port on the rear of the compressor 49*b*, and has its lower side opened and connected to the inlet port on the top surface of the intercooler 51. Further, at a branching port provided on an air passage on the front surface of the intercooler 51, one end of a supplied-air bypass pipe 66 (supplied-air bypass passage 17) is connected, and a part of compressed air cooled by the intercooler 51 is ejected to the supplied-air bypass pipe 66. Further, the other end of the supplied-air bypass pipe 66 is connected to a branching port provided on the front surface of the fresh air passage pipe 64, and a part of the compressed air cooled by the intercooler 51 is circulated to the fresh air passage pipe 64 through the supplied-air bypass pipe 66, and merges with the outside air from the intake filter 63. Further, the supplied-air bypass pipe 66 has the supplied-air bypass valve V2 arranged in its midway portion.

In the intercooler 51, compressed air from the compressor 49*b* flows in from the left rear side through the intake relay pipe 52, and the compressed air is cooled through a heat exchanging action with cooling water supplied from water-supply pipe. The compressed air cooled on a left chamber inside the intercooler 51 flows in the air passage on the front and is introduced into a right chamber, and then ejected to the intake manifold 67 through an ejection port provided on the rear of the right chamber. The intake manifold 67 is provided on the right side face of the cylinder block 25, and is extended in parallel to the head cover 40, on the lower side of the gas manifold 41. It should be noted that, the flow rate of the compressed air supplied to the intake manifold 67 is set by determining the flow rate of the compressed air circulated from the intercooler 51 to the compressor 49*b* according to the opening degree of the supplied-air bypass valve V2.

Further, the turbine 49*a* of the turbocharger 49 connects the inlet port at the rear with the exhaust gas relay pipe 48, and connects the ejection port on the right side with the exhaust gas outlet pipe 50. This way, in the turbocharger 49, exhaust gas is introduced to the inside of the turbine 49*a* from the exhaust manifold 44 through the exhaust gas relay pipe 48, thus rotating the turbine 49*a* as well as the compressor 49*b*, and is exhausted from the exhaust gas outlet pipe 50 to the exhaust path 28 (see FIG. 2). The exhaust gas relay pipe 48 has its rear side opened and connected with the ejection port of the exhaust manifold 44 through a bellows pipe 68, while having its front side opened and connected to the inlet port on the rear side of the turbine 49*a*.

Further, a branching port is provided on the right face side in a midway position of the exhaust gas relay pipe 48, and one end of an exhaust bypass pipe 69 (exhaust bypass passage 18) is connected to this branching port of the exhaust gas relay pipe 48. The other end of the exhaust bypass pipe 69 is connected to a merging port provided at the rear of the exhaust gas outlet pipe 50, and bypasses a part of exhaust gas ejected from the exhaust manifold 44 to the exhaust gas outlet pipe 50 without the turbocharger 49. Further, the exhaust bypass pipe 69 has the exhaust bypass valve V3 in its midway portion, and the flow rate of exhaust gas supplied to the turbine 49*a* is adjusted by setting the flow rate of the exhaust gas to be bypassed from the exhaust manifold 44 to the exhaust gas outlet pipe 50, according to the opening degree of the exhaust bypass valve V3.

A machine side operation control device 71 configured to control starting up and stopping and the like of the engine device 21 is fixed to the left side face of the intercooler 51 through a supporting stay (support member) 72. The machine side operation control device 71 includes a switch that receives an operation by operating personnel for starting up or stopping the engine device 21, and a display that indicates states of each part of the engine device 21. The speed adjuster 201 is fixed on the front end of the left side face of the cylinder head 26. On the rear end side of the left side face of the cylinder block 25, an engine starting device 75 configured to start the engine device 21 is fixed.

Further, the engine controlling device 73 configured to control operations of each part of the engine device 21 is fixed on the trailing end surface of the cylinder block 25 through a supporting stay (support member 74). On the rear end side of the cylinder block 25, there is installed a flywheel 76 connected to the speed reducer 22 to rotate, and the engine controlling device 73 is arranged in an upper part of a flywheel 76. The engine controlling device 73 is electrically connected to sensors (a pressure sensor and a temperature sensor) in each part of the engine device 21 to collect temperature data, pressure data, and the like of each part of the engine device 21, and provides electromagnetic signals to an electromagnetic valve and the like of each part of the engine device 21 to control various operations (fuel oil injection, pilot fuel injection, gas injection, cooling water temperature adjustment, and the like) of the engine device 21.

The cylinder block 25 is provided with a stepwise portion on the upper side of the left side face, and the same number of fuel injection pumps 89 as those of the head covers 40 and the cylinder heads 26 are installed on the top surface of the stepwise portion of the cylinder block 25. The fuel injection pumps 89 are arranged in a single array along the left side face of the cylinder block 25, and their left side faces are connected to the fuel oil pipes (liquid fuel pipes) 42, and their upper ends are connected to the left side face of the cylinder head 26 on the right front, through fuel discharge pipes 90. Of two upper and lower fuel oil pipes 42, one is an oil supply pipe that supplies fuel oil to the fuel injection pump 89, and the other is an oil return pipe that returns the fuel oil from the fuel injection pump 89. Further, the fuel discharge pipes 90 each connects to a main fuel injection valve 79 (see FIG. 6) via a fuel passage in each cylinder head 26 to supply the fuel oil from the fuel injection pump 89 to the main fuel injection valve 79.

The fuel injection pumps 89 are provided in parallel to the array of the head covers 40, in positions at the rear left of the cylinder heads 26 each connected to the fuel discharge pipe 90, on the stepwise portion of the cylinder block 25. Further, the fuel injection pumps 89 are aligned in a single array in position between the cylinder heads 26 and the fuel oil pipes 42. Each fuel injection pump 89 performs an operation of pushing up a plunger by rotation of pump cam on the cam shaft (not shown) in the cylinder block 25. By pushing up the plunger, the fuel injection pump 89 raises the pressure of the fuel oil supplied to the fuel oil pipe 42 to a high pressure, and supplies the high pressure fuel oil in the cylinder head 26 to the fuel injection pump 89 via the fuel discharge pipe 90.

The front end of the common-rail 47 is connected to the ejection side of the pilot fuel pump 54, and the pilot fuel ejected from the pilot fuel pump 54 is supplied to the common-rail 47. Further, the gas manifold 41 extends along the array of the head covers 40 at a height position between the exhaust manifold 44 and the intake manifold 67. The gas manifold 41 includes a gas main pipe 41a extending in the front/rear direction and having its front end connected to a gas inlet pipe 97; and a plurality of gas branch pipes 41b branched off from the upper surface of the gas main pipe 41a towards the cylinder heads 26. The gas main pipe 41a has on its upper surface connection flanges at regular intervals, which are fastened to the inlet side flanges of the gas branch pipes 41b. An end portion of each gas branch pipe 41b on the opposite side to the portion connecting to the gas main pipe 41a is connected to the right side face of a sleeve in which the gas injector 98 is inserted from above.

Figure 13:
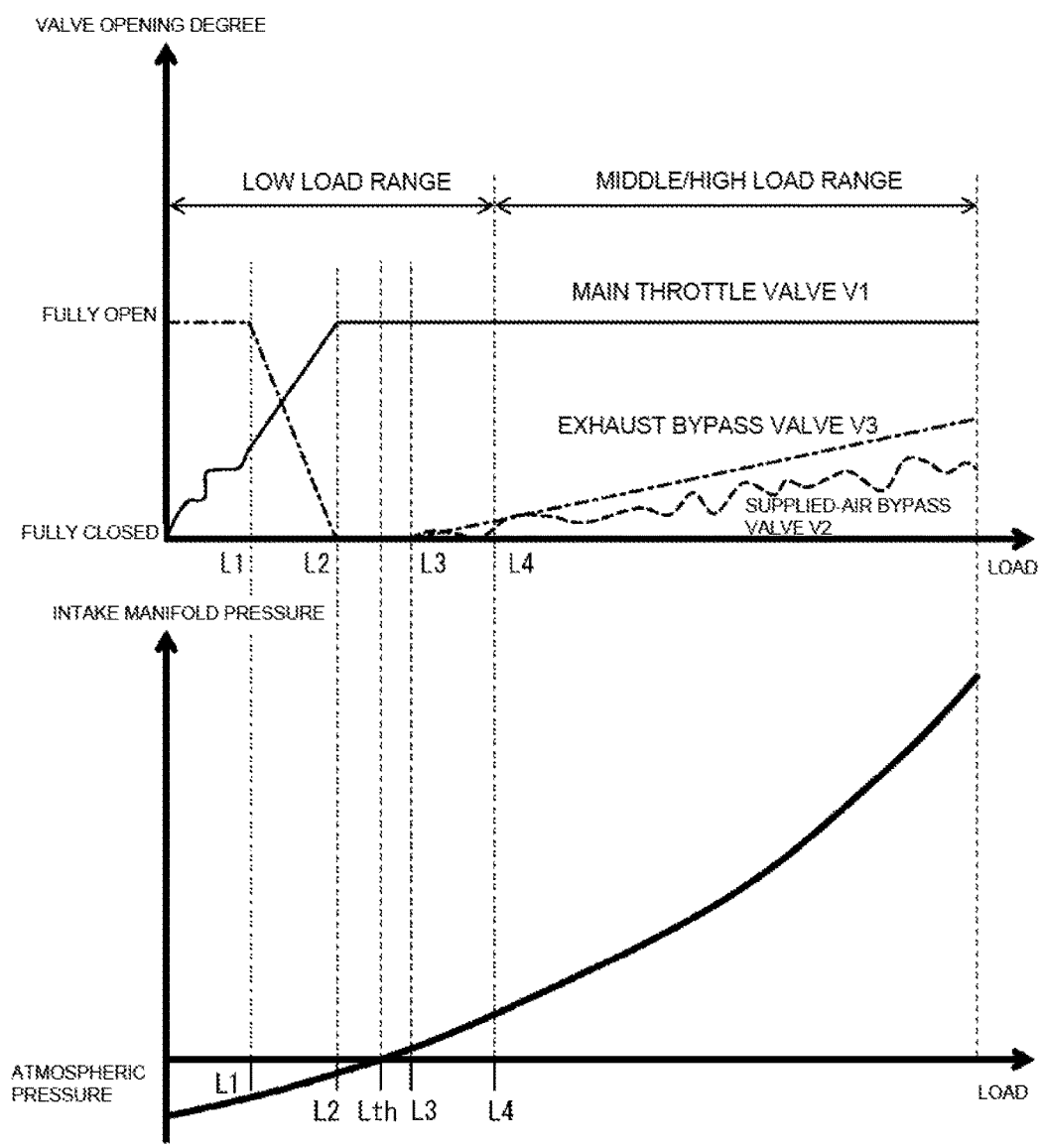
FIG. 13 A diagram for explaining the air-fuel ratio control with respect to a load when the engine device is operated in the gas mode.

Next, the following describe, with mainly FIG. 13 and the like, an air flow rate control at a time of operating the dual-fuel engine 21 (engine device 21) having the above-described structure in the gas mode.

As shown in FIG. 13, the engine controlling device 73 performs a feedback control (PID control) with respect to the valve opening degree of the main throttle valve V1, when the engine load is in a low load range (load range of not more than load L4) and less than a predetermined load L1. At this time, the engine controlling device 73 sets a target value (target pressure) of the intake manifold pressure according to the engine load. Then, the engine controlling device 73 receives a measurement signal from the pressure sensor 39 and confirms the measured value (measured pressure) of the intake manifold pressure to obtain the difference from the target pressure. This way, based on the difference value between the target pressure and the measured pressure, the engine controlling device 73 executes the PID control of the valve opening degree of the main throttle valve V1 to bring the air pressure of the intake manifold 67 close to the target pressure.

When the engine load is the predetermined load L1 or higher, the engine controlling device 73 performs a map control with respect to the valve opening degree of the main throttle valve V1. At this time, the engine controlling device 73 refers to a data table DT1 storing the valve opening degrees of the main throttle valve V1 relative to the engine loads, and sets a valve opening degree of the main throttle valve V1 corresponding to the engine load. When the engine load is a load L2 (L1<L2<Lth<L4) or higher, the engine controlling device 73 performs control to fully open the main throttle valve V1. It should be noted that the load L2 is in the low load range, and is set to be a lower load than a load Lth at which the intake manifold pressure is the atmospheric pressure.

When the engine load is in the low load range and lower than a predetermined load L3 (Lth<L3<L4), the engine controlling device 73 performs control to fully open the supplied-air bypass valve V2. When the engine load is the predetermined load L3 or higher, the engine controlling device 73 performs feedback control (PID control) with respect to the valve opening degree of the supplied-air bypass valve V2. At this time, based on the difference value between the target pressure according to the engine load and the measured pressure by the pressure sensor 39, the engine controlling device 73 executes the PID control of the valve opening degree of the supplied-air bypass valve V2 to bring the air pressure of the intake manifold 67 close to the target pressure.

The engine controlling device 73 performs map control with respect to the valve opening degree of the exhaust bypass valve V3, throughout the entire range of engine load. At this time, the engine controlling device 73 refers to a data table DT2 storing the valve opening degrees of the exhaust bypass valve V3 relative to the engine loads, and sets a valve opening degree of the exhaust bypass valve V3 corresponding to the engine load. That is, when the engine load is lower than the predetermined load L1, the exhaust bypass valve V3 is fully opened. When the engine load is higher than the predetermined load L1, the opening degree of the exhaust bypass valve V3 is monotonically reduced, and the exhaust bypass valve V3 is fully opened at the predetermined load L2. Then, while the engine load is higher than the predetermined load L2, but not more than the predetermined load L3, the exhaust bypass valve V3 is fully opened. When the engine load is higher than the predetermined load L3 in the low load range, the opening degree of the exhaust bypass valve V3 is monotonically increased with respect to the engine load. That is, the exhaust bypass valve V3 is gradually opened.

As shown in FIG. 13, when the load imposed to the engine (engine load) is in the low load range, and higher than a first predetermined load L3, the engine controlling device 73 controls the opening degree of the main throttle valve V1 to be fully opened. Further, the engine controlling device 73 adjusts the pressure of the intake manifold 67 to a target value according to the load, by performing feedback control (PID control) with respect to the supplied-air bypass valve V2 and by performing map control with respect to the exhaust bypass valve V3. While the load on the engine is the first predetermined load L3, the supplied-air bypass valve V2 and the exhaust bypass valve V3 are fully opened.

In cases of optimizing the turbocharger 49 for a diesel mode specification, the responsiveness of the pressure control for the intake manifold 67 is made suitable even in the gas mode operation, by controlling the opening degree of the supplied-air bypass valve V2 according to fluctuation in the engine load. Therefore, shortage and surplus in the air amount necessary for combustion are prevented at a time of load fluctuation, and the engine device 21 is suitably operated in the gas mode, even if it uses the turbocharger 49 optimized for the diesel mode.

Further, by controlling the opening degree of the exhaust bypass valve V3 according to fluctuation in the engine load, air that matches with the air-fuel ratio required for combustion of the gaseous fuel is supplied to the engine device 21. Further, by performing in combination a control operation by the supplied-air bypass valve V2 with a good responsiveness, the response speed to the load fluctuation during the gas mode can be accelerated. Therefore, knocking due to an insufficient amount of air required for combustion at the time of load fluctuation can be prevented.

Further, when the engine load is in the low load range and is lower than a second predetermined load L1 which is lower than the first predetermined load L3, the feedback control (PID control) is performed with respect to the main throttle valve V1. On the other hand, when the engine load is higher than the second predetermined load L1, the engine controlling device 73 performs the map control based on the data table DT1 with respect to the main throttle valve V1. Further, when the engine load is determined as to be lower than the predetermined load L1, the supplied-air bypass valve V2 is fully opened, and the exhaust bypass valve V3 is fully opened. That is, when the pressure of the exhaust manifold 44 is a negative pressure which is lower than the atmospheric pressure, the exhaust bypass valve V3 is fully opened to stop driving of the turbine 49a, so that surging and the like in the turbocharger 49 can be prevented. Further, by fully opening the supplied-air bypass valve V2, control of the intake manifold pressure by the main throttle valve V1 can be made highly responsive.

Further, when the engine load is the second predetermined load L1 or higher, but lower than the third predetermined load L2 which takes a value between the first and second predetermined loads L3 and L1, the map control based on the data table DT1 is performed with respect to the main throttle valve V1. Further, the supplied-air bypass valve V2 is fully opened, and the exhaust bypass valve V3 is subjected to the map control based on a data table DT2. When the engine load is equal to the first predetermined load L3, the main throttle valve V1 is fully opened, and the supplied-air bypass valve V2 and the exhaust bypass valve V3 are fully opened, thereby enabling switching over from the diesel mode to the gas mode.

Figure 14:
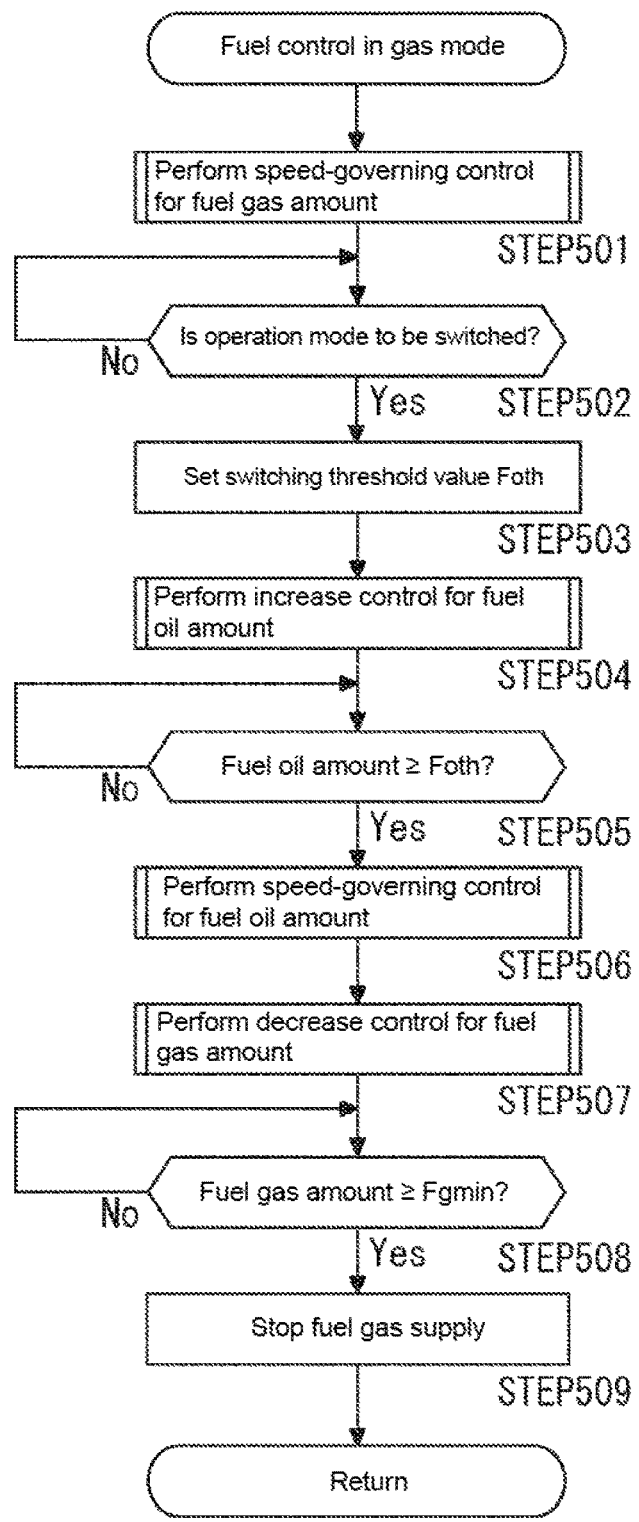
FIG. 14 A flowchart showing a basic operation of a fuel supply control by an engine controlling device during the gas mode.
Figure 15:
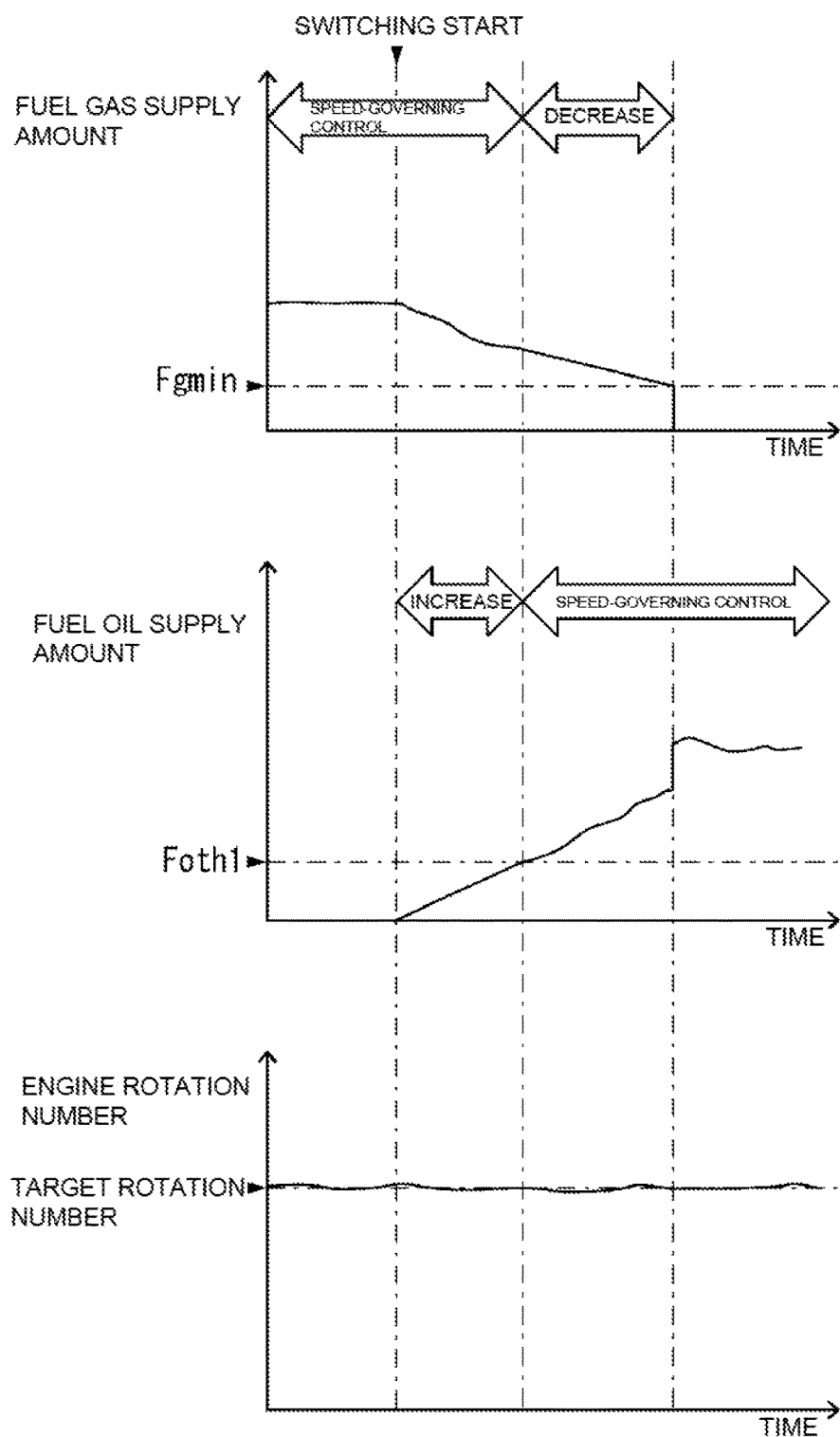
FIG. 15 A timing chart showing a relation between transitions in supply amounts of a fuel gas and a fuel oil and an engine rotation number, when an operation mode of the engine device operating with a low load and at a low rotation number is switched from the gas mode to the diesel mode.
Figure 16:
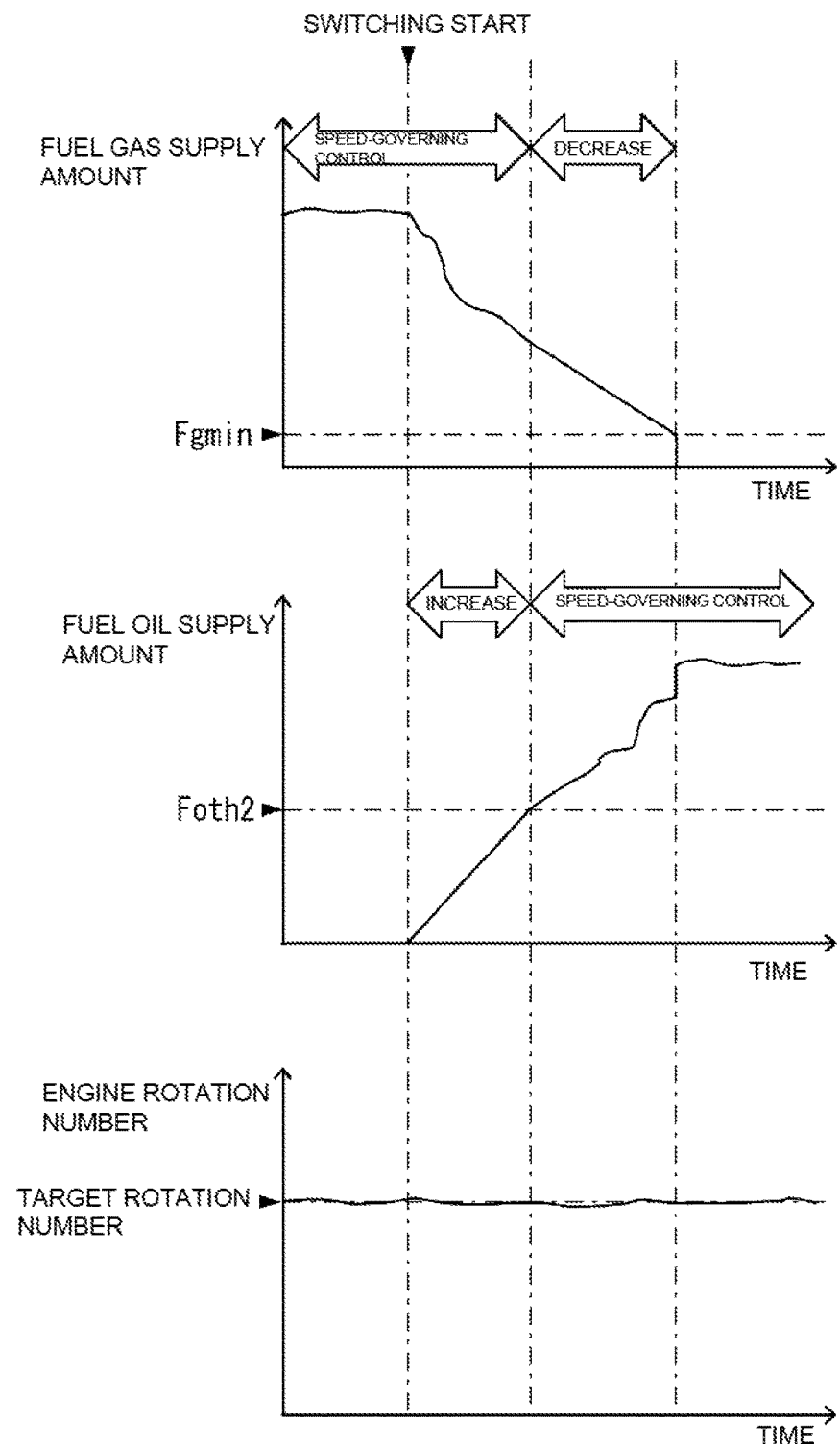
FIG. 16 A timing chart showing a relation between transitions in supply amounts of a fuel gas and a fuel oil and an engine rotation number, when the operation mode of the engine device operating with a high load and at a high rotation number is switched from the gas mode to the diesel mode.
Figure 17:
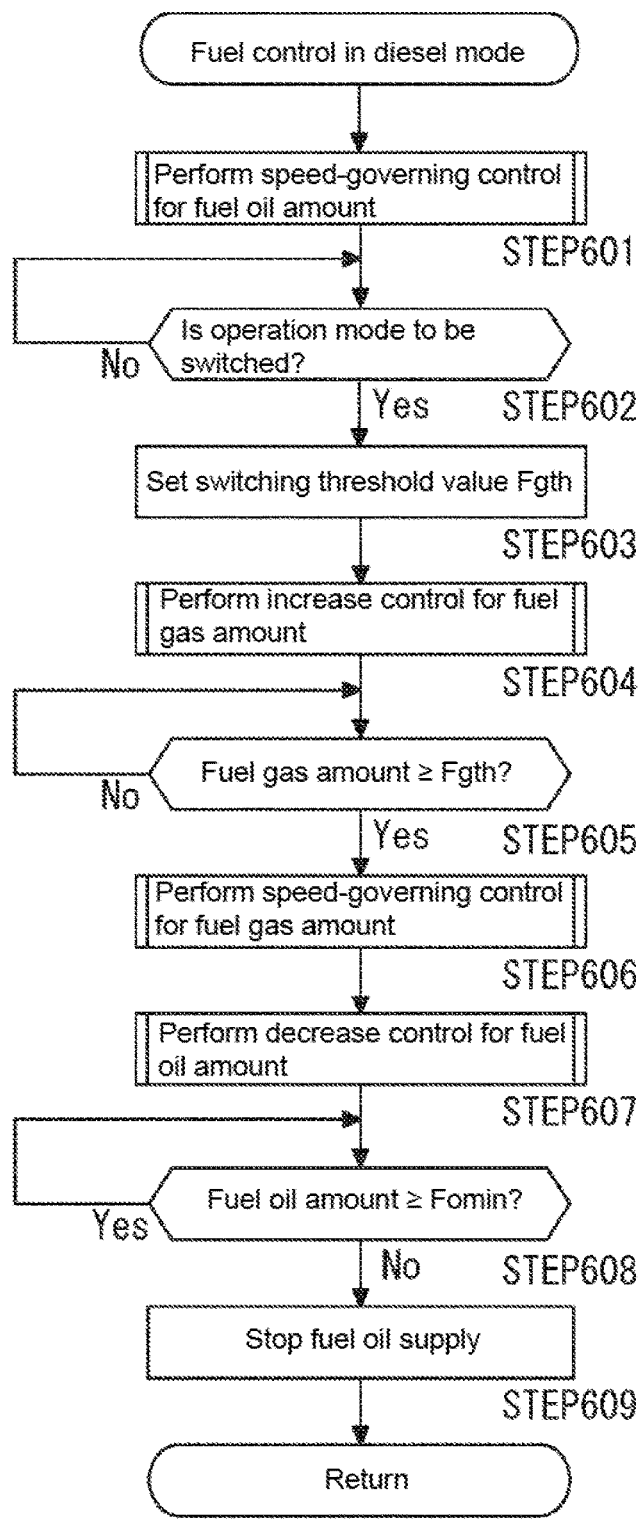
FIG. 17 A flowchart showing an operation of a fuel supply control by an engine controlling device during the diesel mode.
Figure 18:
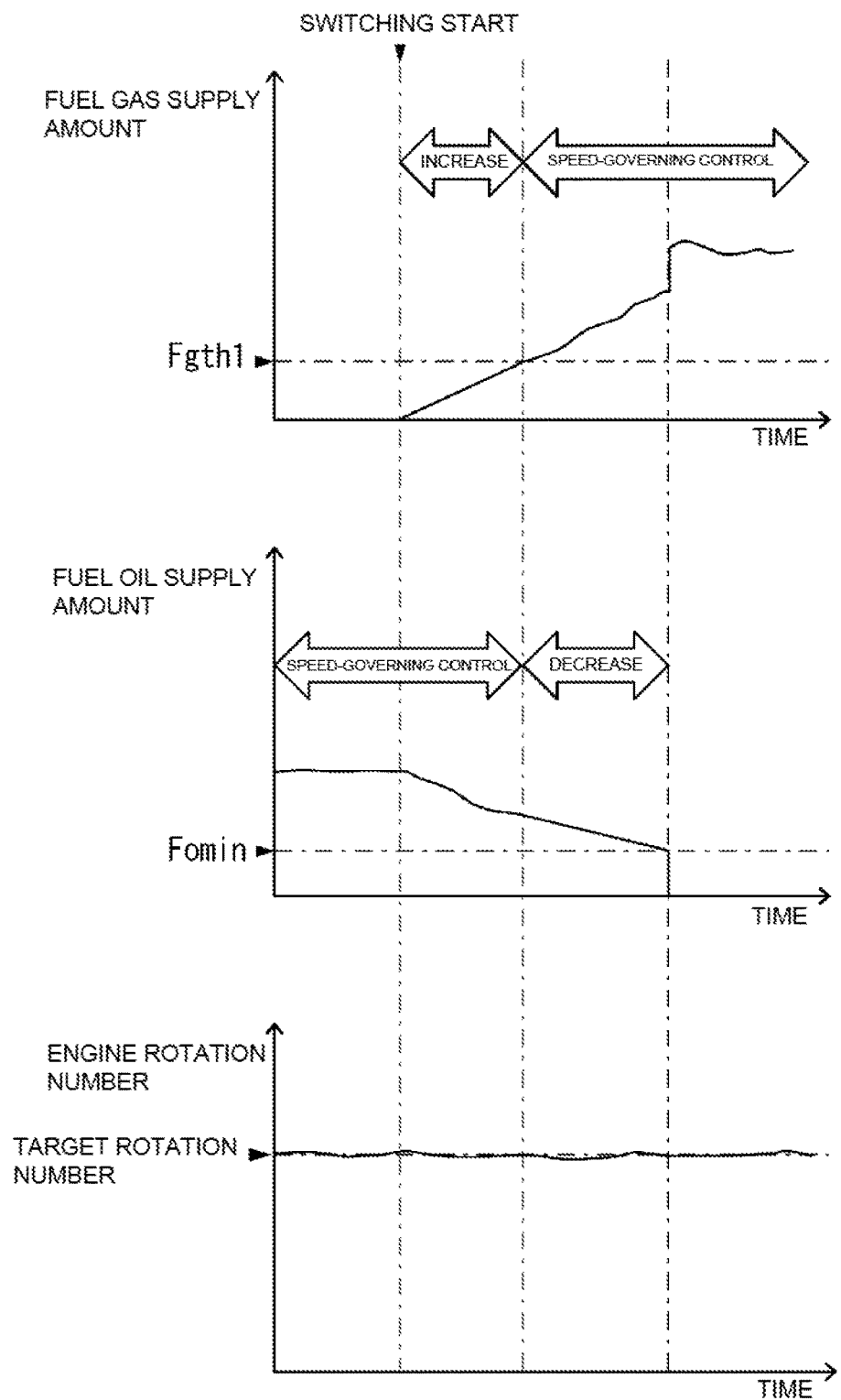
FIG. 18 A timing chart showing a relation between transitions in supply amounts of a fuel gas and a fuel oil and an engine rotation number, when the operation mode of the engine device operating with a low load and at a low rotation number is switched from the diesel mode to the gas mode.
Figure 19:
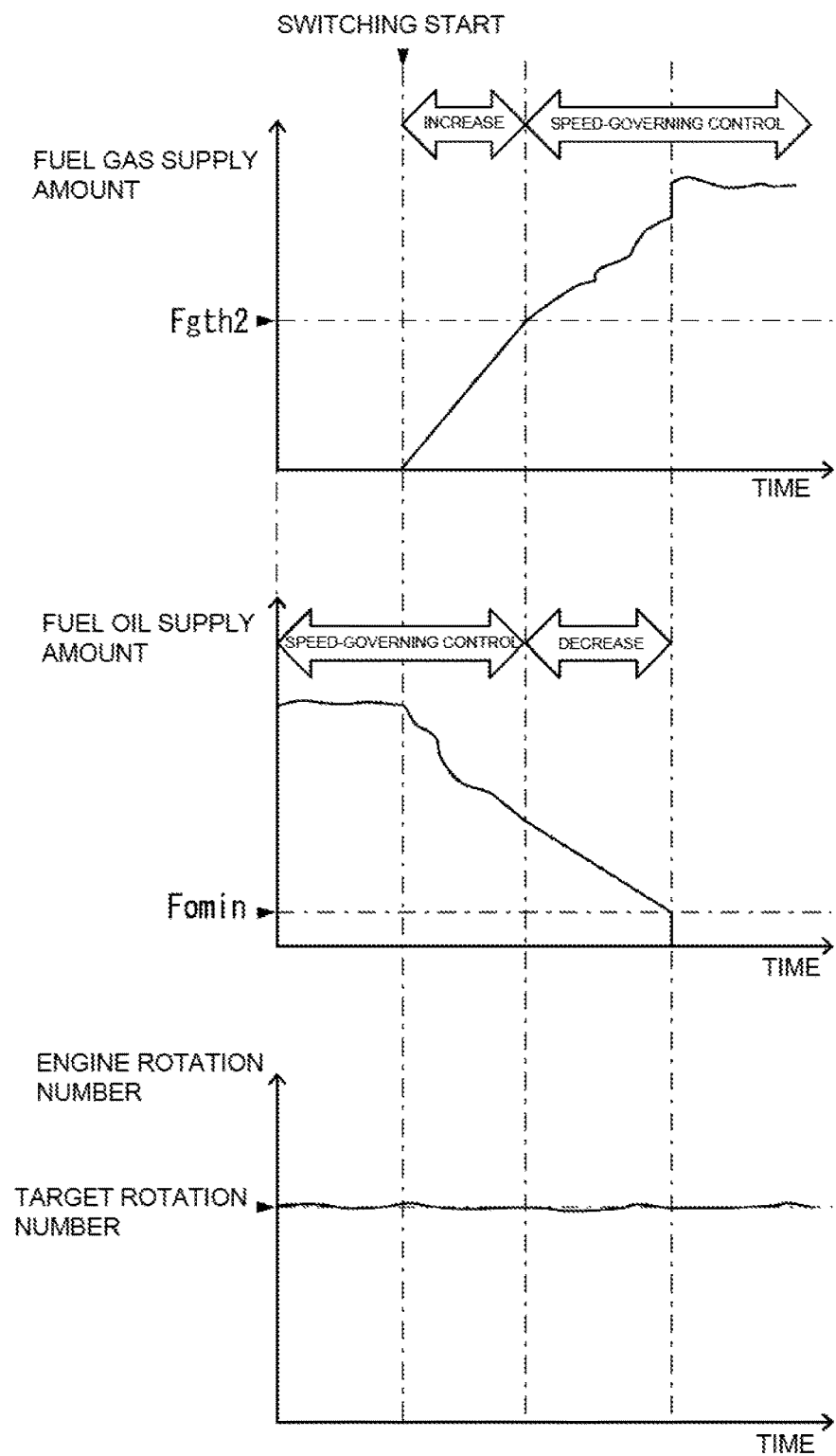
FIG. 19 A timing chart showing a relation between transitions in supply amounts of a fuel gas and a fuel oil and an engine rotation number, when the operation mode of the engine device operating with a high load and at a high rotation number is switched from the diesel mode to the gas mode.

Next, the following describes fuel control when the operational state of the engine device 21 is transited between the gas mode to the diesel mode. First, with reference to FIG. 14 to FIG. 19, a basic control operation of the fuel control at the time of switching the mode is described. FIG. 14 is a flowchart showing the basic operation of the fuel control in the engine device 21 operating in the gas mode. FIG. 17 is a flowchart showing the basic operation of the fuel control in the engine device 21 operating in the diesel mode. FIG. 15 and FIG. 18 are each a timing chart at a time of switching when the engine device 21 is operated at a low rotation number and a low load. FIG. 16 and FIG. 19 are each a timing chart at a time of switching when the engine device 21 is operated at a high rotation number and a high load.

As shown in FIG. 14, while the engine device 21 is operating in the gas mode, the engine controlling device 73 performs speed-governing control of the fuel gas supply amount (fuel gas injection amount) to the cylinder 77 (cylinder 36) based on a signal from the engine rotation sensor 20, so as to make the engine rotation number close to a target value (STEP 501). That is, the engine controlling device 73 performs feedback control (PID control) with respect to the opening degree of the gas injector 98, so as to adjust the fuel gas injection amount from the gas injector 98 and execute the speed-governing control of the fuel gas supply amount.

The engine controlling device 73 determines whether to switch the operation of the engine device 21 to the diesel mode (STEP 502). the engine controlling device 73 determines that the operation of the engine device 21 is to be switched to the diesel mode, when an abnormality (e.g., a drop in the fuel gas pressure, a drop in the intake manifold pressure, an increase in the gas temperature, an increase in the air temperature, or disconnection of sensors) is taking place in the gas mode operation of the engine device 21, or the current location of navigation is outside the restricted sea area restricting emission amount of Nox (nitrogen oxides) or SOx (sulfur oxides).

The engine controlling device 73, when determining that the operation of the engine device 21 is to be switched to the diesel mode (Yes in STEP 502), sets a switching threshold value Foth which is a reference for switching the control operation of the fuel oil supply amount from a ramp functional (proportion functional) increase control to speed-governing control (STEP 503). At this time, the engine controlling device 73 refers to a threshold value setting table for determining the switching threshold value Foth based on the engine rotation number and the engine load, and sets the switching threshold value Foth based on the measurement signals (the engine load and the engine rotation number) transmitted from the load measuring device 19 and the engine rotation sensor 20.

It should be noted that, in the threshold value setting table, the switching threshold value Foth is set at a small amount if the engine rotation number is a low rotation number, and the switching threshold value Foth is set at a small amount if the engine load is a low load. That is, when the engine rotation number is a low rotation number and the engine load is a low load, the switching threshold value Foth is set at a small amount (e.g., threshold value Foth1 in FIG. 15). On the other hand, if the engine rotation number is a high rotation number and the engine load is a high load, the switching threshold value Foth is set at a large amount (e.g., threshold value Foth2 in FIG. 16).

Then, to control the fuel injection amount from the main fuel injection valve 79, the engine controlling device 73 ramp functionally and monotonously increases, with respect to the time, the fuel oil supply amount from the fuel injection pump 89 to the main fuel injection valve 79 (STEP 504). That is, the engine controlling device 73 operates the speed adjuster 201 to change the rack position of the control rack 202 in the fuel injection pump 89, thereby performing increase control of the fuel oil supply amount.

The engine controlling device 73 confirms the fuel oil supply amount by, for example, confirming the rack position of the control rack position 202 through the speed adjuster 201, and when the fuel oil supply amount is equal to or more than the switching threshold value Foth (Yes in STEP 505), switches the control operation of the fuel oil supply amount to the speed-governing control based on signals from the engine rotation sensor 20 (STEP 506). That is, the engine controlling device 73 performs feedback control (PID control) with respect to the rack position of the control rack 202 in the fuel injection pump 89, so as to adjust the fuel gas injection amount from the main fuel injection valve 79 and execute the speed-governing control of the fuel oil supply amount.

Next, the engine controlling device 73 switches the control operation of the fuel gas supply amount from the speed-governing control to a ramp functional (proportion functional) decrease control (STEP 507). That is, the fuel gas injection amount from the gas injector 98 is ramp functionally and monotonously decreased with respect to the time. At this time, the engine controlling device 73 shortens step by step an open period of the valve of the gas injector 98, to perform the decrease control of the fuel gas supply amount. The engine controlling device 73, for example, confirms the open period of the valve of the gas injector 98, and when the fuel gas supply amount drops below a minimum value (lower limit value) Fgmin (No in STEP 508), stops supply from the gas valve unit 35 (STEP 509).

Through the operation following the flowchart of FIG. 14, the engine device 21, at a time of switching the operation from the gas mode to the diesel mode, can perform the increase control of the fuel oil supply amount and keep the engine rotation number at a target rotation number through the speed-governing control of the fuel gas supply amount, as shown in FIG. 15 and FIG. 16. After that, when the fuel oil supply amount reaches the switching threshold value Foth, the fuel oil supply amount is subjected to the speed-governing control, and the fuel gas supply amount is subjected to the decrease control, thereby keeping the engine rotation number at the target rotation number. At this time, since the switching threshold value Foth is set according to the load and the rotation number of the engine device 21, the engine rotation number will not rise to a rotation number beyond an upper limit value (overspeed), during an operation with a low load and at a low rotation number, and good responsiveness to the load fluctuation is maintained during an operation with a high load and at a high rotation number.

In cases where the engine device 21 is operating with a low load and at a low rotation number, by setting the switching threshold value Foth to a small value Foth1 as shown in FIG. 15, the control of the fuel oil supply can be switched to the speed-governing control and the fuel gas supply can be stopped, without raising the engine rotation number to the target rotation number. Further, in cases where the engine device 21 is operating with a high load and at a high rotation number, by setting the switching threshold value Foth to a high value Foth2 as shown in FIG. 16, the supply amount of fuel which significantly affects the engine rotation number is subjected to the speed-governing control. Therefore, for example, the engine rotation number can be kept nearby the target rotation number even when the load is rapidly decreasing, and the engine rotation number can be prevented from rising to an extend that leads to an emergency stop.

On the other hand, as shown in FIG. 17, while the engine device 21 is operating in the diesel mode, the engine controlling device 73 performs speed-governing control of the fuel oil supply amount (fuel oil injection amount) to the cylinder 77 (cylinder 36) based on a signal from the engine rotation sensor 20, so as to make the engine rotation number close to the target value (STEP 601). The engine controlling device 73, when determining that the operation of the engine device 21 is to be switched to the gas mode (Yes in STEP 602), sets a switching threshold value Fgth which is a reference for switching the control operation of the fuel gas supply amount from the speed-governing control to the ramp functional increase control (STEP 603).

It should be noted that, the engine controlling device 73 determines to switch the operation of the engine device 21 to the gas mode, when, for example, the ship is navigated from a location nearby a sea area restricting emission of NOx and SOx to into the restricted sea area. Further, the engine controlling device 73 refers to a threshold value setting table for determining the switching threshold value Fgth based on the engine rotation number and the engine load, and sets the switching threshold value Fgth. It should be noted that, in the threshold value setting table, the switching threshold value Fgth is set at a small amount if the engine rotation number is a low rotation number, and the switching threshold value Fgth is set at a small amount if the engine load is a low load. That is, when the engine rotation number is a low rotation number and the engine load is a low load, the switching threshold value Fgth is set at a small amount (e.g., threshold value Fgth1 in FIG. 18). On the other hand, if the engine rotation number is a high rotation number and the engine load is a high load, the switching threshold value Fgth is set at a large amount (e.g., threshold value Fgth2 in FIG. 19).

Then, the engine controlling device 73 causes the gas valve unit 35 to perform supply, and extends the open period of the valve of the gas injector 98 step by step, to ramp functionally and monotonously increase the fuel gas supply amount with respect to the time (STEP 604). When the fuel gas supply amount is equal to or more than the switching threshold value Fgth (Yes in STEP 605), the engine controlling device 73 switches the control operation of the fuel gas supply amount to the speed-governing control based on a signal from the engine rotation sensor 20 (STEP 606) and switches the control operation of the fuel oil supply amount to the ramp functional decrease control (STEP 607). Then when the fuel oil supply amount drops below the minimum value (lower limit value) Fogmin (No in STEP 608), the engine controlling device 73 stops supply from the liquid fuel tank 33 (STEP 609).

Through the operation following the flowchart of FIG. 17, the engine device 21, at a time of switching the operation from the diesel mode to the gas mode, can perform the increase control of the fuel gas supply amount and keep the engine rotation number at the target rotation number through the speed-governing control of the fuel oil supply amount, as shown in FIG. 18 and FIG. 19. After that, when the fuel gas supply amount reaches the switching threshold value Fgth, the fuel gas supply amount is subjected to the speed-governing control, and the fuel oil supply amount is subjected to the decrease control, thereby keeping the engine rotation number at the target rotation number. At this time, since the switching threshold value Fgth is set according to the load and the rotation number of the engine device 21, the engine rotation number will not rise to a rotation number beyond the upper limit value (overspeed), during an operation with a low load and at a low rotation number, and good responsiveness to the load fluctuation is maintained during an operation with a high load and at a high rotation number, as in the case of switching from the gas mode to the diesel mode.

Figure 20:
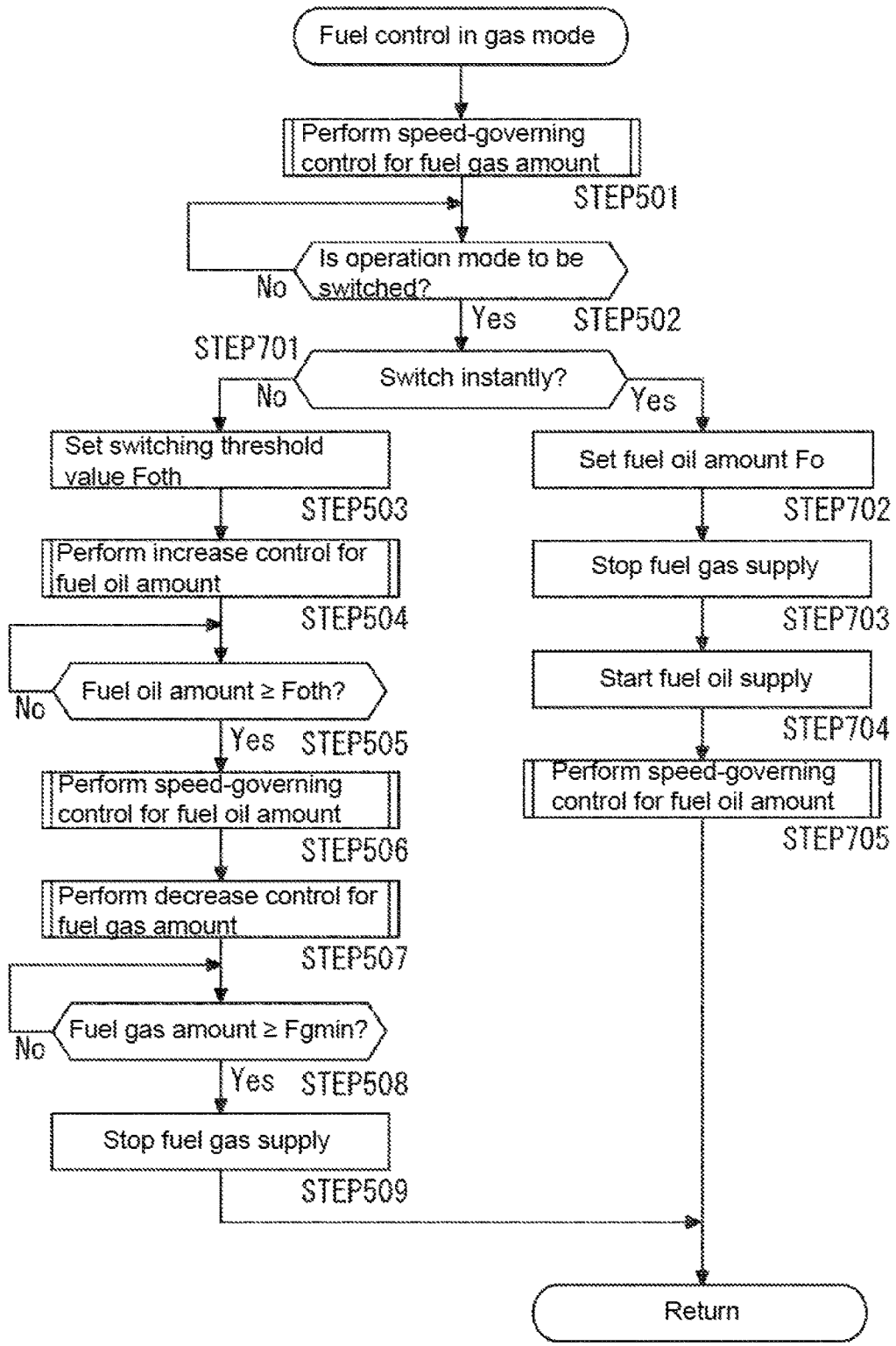
FIG. 20 A flowchart of a first example showing an operation of a fuel supply control by an engine controlling device during the gas mode.
Figure 21:
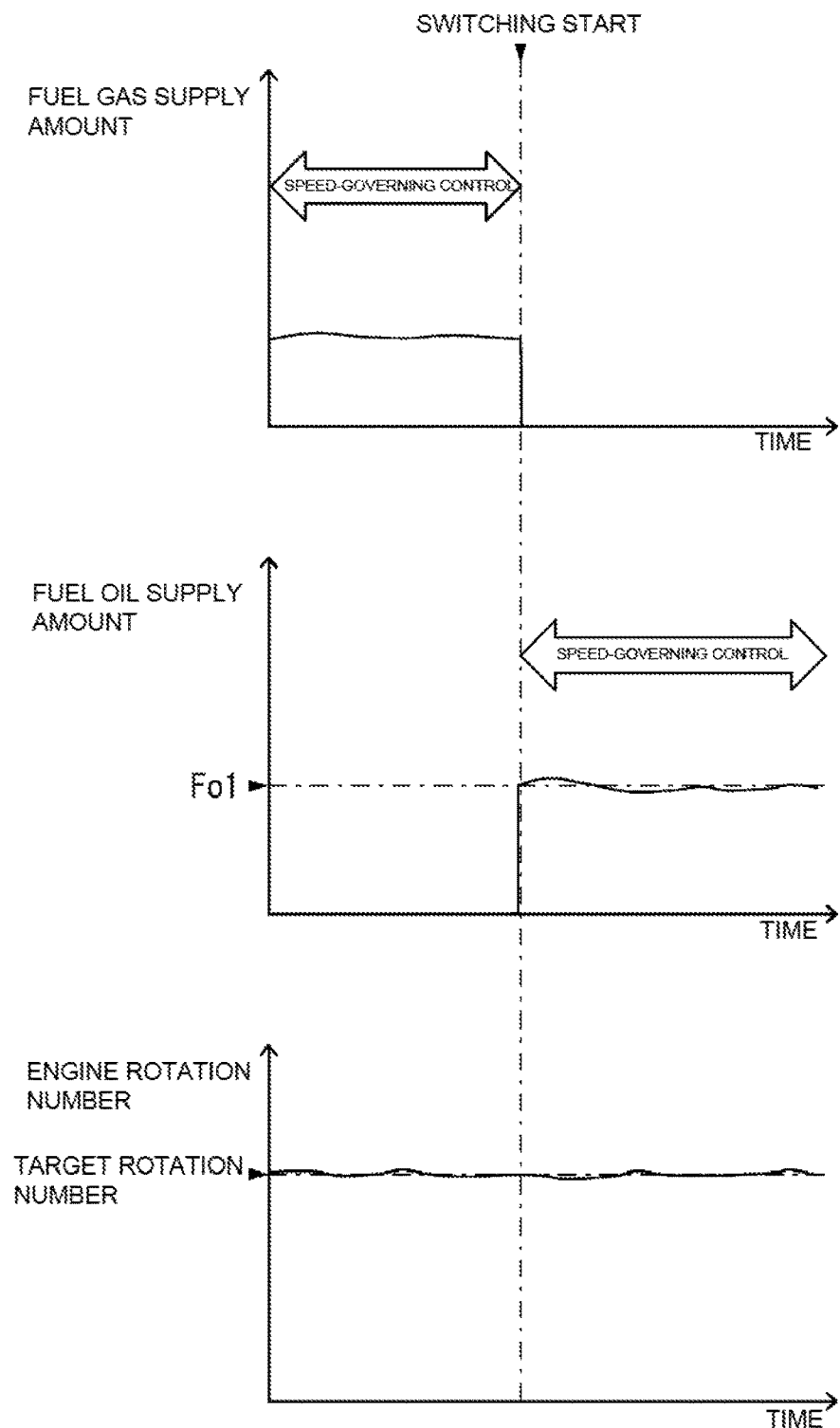
FIG. 21 A timing chart showing a relation between transitions in supply amounts of a fuel gas and a fuel oil and an engine rotation number, when an instant switching to the diesel mode is executed to the engine device operating with a low load and at a low rotation number.
Figure 22:
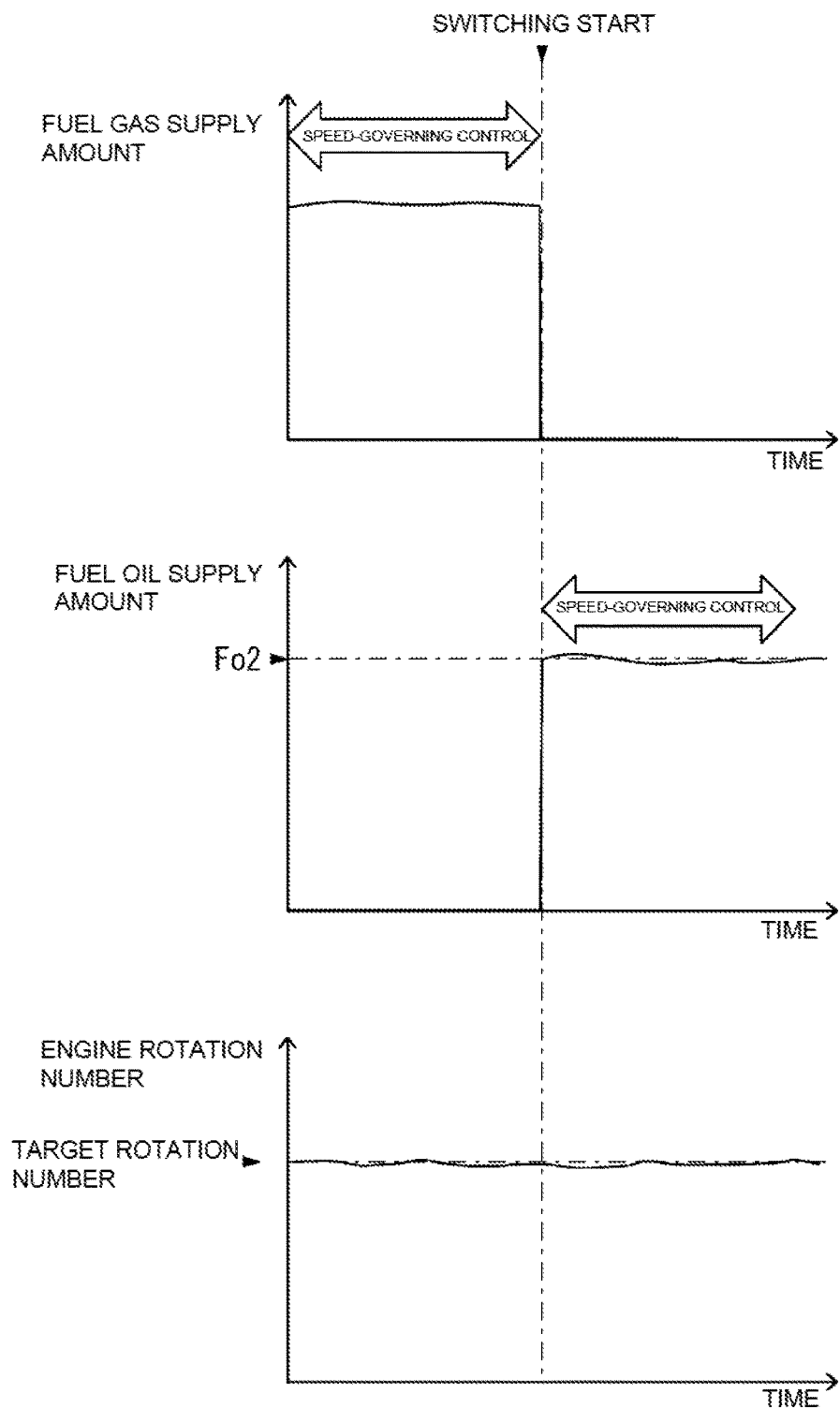
FIG. 22 A timing chart showing a relation between transitions in supply amounts of a fuel gas and a fuel oil and an engine rotation number, when the instant switching to the diesel mode is executed to the engine device operating with a high load and at a high rotation number.

With reference to FIG. 20 to FIG. 22, the following describes a first example of the fuel control in the gas mode. The fuel control of the present example is based on the control operation shown in FIG. 14 to FIG. 16, as hereinabove described. Therefore, the control steps that are identical to the above-described basic control operations (see FIG. 14 to FIG. 16) are given the same reference symbols and the detailed description for these steps are omitted.

As shown in the flowchart of FIG. 20, in the present example, unlike the above-described basic control operations, the engine controlling device 73, when determining to switch the operation mode of the engine device 21 to the diesel mode (Yes in STEP 502), determines whether to instantly switch the operation mode (STEP 701). When the instant switching from the gas mode to the diesel mode is not to be performed (No in STEP 701), the switching threshold value Foth is set and then when the fuel oil supply amount reaches the switching threshold value Foth, the control of the fuel oil supply is changed to the speed-governing control, and the control of the fuel gas supply is eventually stopped (STEP 503 to STEP 509) as in the basic control operation (see FIG. 14).

When the instant switching from the gas mode to the diesel mode is to be executed (Yes in STEP 701), the engine controlling device 73 sets a fuel oil supply amount Fo, and stops the fuel gas supply and starts the fuel oil supply (STEP 702 to STEP 704), and then performs speed-governing control of the fuel oil supply amount (STEP 705). At this time, the engine controlling device 73 refers to an instant switching setting table for determining the fuel oil supply amount Fo at a time of instant switching, based on the engine rotation number and the engine load, and sets the fuel oil supply amount Fo based on the measurement signals (the engine load and the engine rotation number) transmitted from the load measuring device 19 and the engine rotation sensor 20. It should be noted that, in STEP 702, the instant switching to the diesel mode is executed when an abnormality (e.g., a drop in the fuel gas pressure, a drop in the intake manifold pressure, an increase in the gas temperature, an increase in the air temperature, or disconnection of sensors) takes place in the gas mode operation of the engine device 21.

It should be noted that, in the instant switching setting table, the fuel oil supply amount Fo is set at a small amount if the engine rotation number is a low rotation number, and the fuel oil supply amount Fo is set at a small amount if the engine load is a low load. That is, when the engine rotation number is a low rotation number and the engine load is a low load, the fuel oil supply amount Fo is set at a small amount (e.g., fuel oil supply amount Fo1 in FIG. 21). On the other hand, if the engine rotation number is a high rotation number and the engine load is a high load, the fuel oil supply amount Fo is set at a large amount (e.g., fuel oil supply amount Fo2 in FIG. 22).

Through the operation following the flowchart of FIG. 20, the engine device 21, at a time of performing instant switching of the operation from the gas mode to the diesel mode, can stop the fuel gas supply and start the fuel oil supply based on the set fuel oil supply amount Fo, as shown in FIG. 21 and FIG. 22. At this time, since the fuel oil supply amount Fo is set according to the load and the rotation number of the engine device 21, the engine rotation number will not rise to a rotation number beyond the upper limit value (overspeed), during an operation with a low load and at a low rotation number, and good responsiveness to the load fluctuation is maintained during an operation with a high load and at a high rotation number.

In cases where the engine device 21 is operating with a low load and at a low rotation number, by setting the fuel oil supply amount Fo to a small value Fo1 as shown in FIG. 21, the control of the fuel oil supply can be instantly switched to the speed-governing control and the fuel gas supply can be stopped, without raising the engine rotation number to the target rotation number. Further, in cases where the engine device 21 is operating with a high load and at a high rotation number, by setting the fuel oil supply amount Fo to a high value Fo2 as shown in FIG. 22, a drop in the engine rotation number due to insufficient fuel can be avoided, and the engine rotation number can be kept at the target rotation number even after the instant switching.

Further, the value of the fuel oil supply amount Fo is corrected based on, for example, the temperature of the air flowing in the intake manifold 67, the temperature of the lubricating oil from the lubricating oil strainer 59, and the temperature of the fuel flowing in the fuel oil pipe 42. At this time, the engine controlling device 73 refers to the instant switching setting table to set the initial value of the fuel oil supply amount Fo based on the engine rotation number and the engine load, and then multiply the initial value by a coefficient calculated from each of the air temperature, the lubricant oil temperature, and the fuel oil temperature, to obtain correction value for the fuel oil supply amount Fo. At the time of executing the instant switching, the fuel oil supply is started based on the correction value of the fuel oil supply amount Fo. This way, the fuel oil supply amount Fo can be set according to the operation environment of the engine device 21, and therefore the engine device 21 can be stably operated in the diesel mode after the instant switching.

Figure 23:
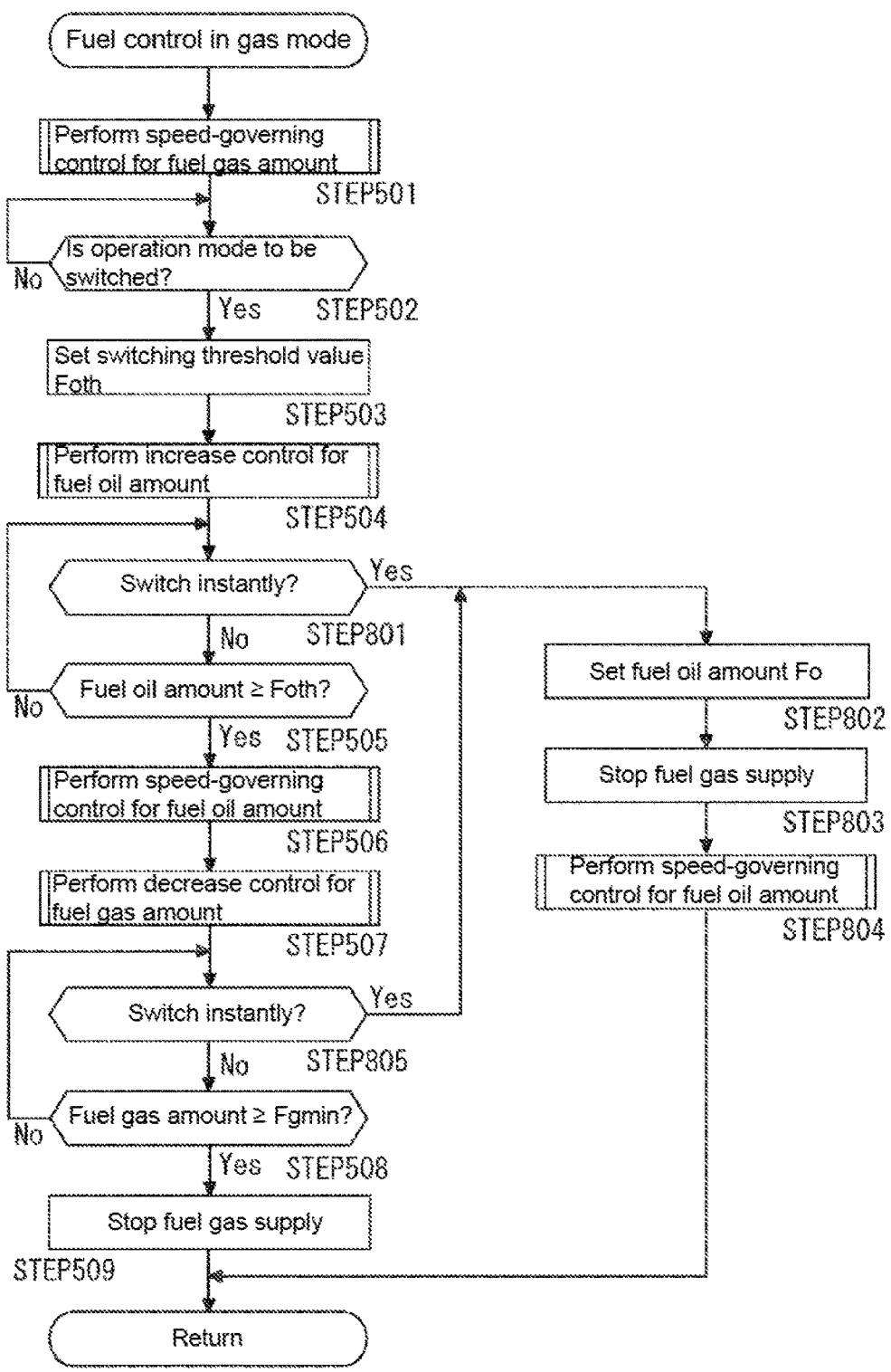
FIG. 23 A flowchart of a second example showing an operation of a fuel supply control by an engine controlling device during the gas mode.

With reference to FIG. 23, the following describes a second example of the fuel control in the gas mode. The fuel control of the present example is based on the control operation shown in FIG. 14 to FIG. 16, as in the first example. Therefore, the control steps that are identical to the above-described basic control operations (see FIG. 14 to FIG. 16) are given the same reference symbols and the detailed description for these steps are omitted.

As shown in the flowchart of FIG. 23, in the present example, unlike the control operations of the first example, the engine controlling device 73, when determining to switch the operation mode of the engine device 21 to the diesel mode (Yes in STEP 502), sets the switching threshold value Foth and then starts increase control of the fuel oil supply amount (STEP 503 to STEP 504). Then, the engine controlling device 73 determines whether to instantly switch the operation mode (STEP 801). When the instant switching is to be executed (Yes in STEP 801), the fuel oil supply amount Fo is set to perform speed-governing control to the fuel oil supply amount, and the fuel gas supply is stopped (STEP 802 to STEP 804).

Further, after the start of the increase control of the fuel oil supply amount, the engine controlling device 73 determines whether to perform instant switching of the operation mode (STEP 805), even after the fuel oil supply amount reaches or surpasses the switching threshold value Foth (Yes in STEP 505) and the control of the fuel oil supply is switched to the speed-governing control while the control of the fuel gas is switched to the decrease control (STEP 506 to STEP 507). Then, when the instant switching is to be executed (Yes in STEP 805), the fuel oil supply amount Fo is set to perform speed-governing control to the fuel oil supply amount, and the fuel gas supply is stopped (STEP 802 to STEP 804).

Through the operation following the flowchart of FIG. 23, the engine device 21 can respond to the instant switching to the diesel mode, even in cases where the replacement of the fuel gas and fuel oil is executed step by step to switch the operation from the gas mode to the diesel mode. Therefore, even during the switching from the gas mode to the diesel mode, it is possible respond to a situation which requires urgent switching to the diesel mode, and hence stable navigation of the ship can be continued, without an emergency stop.

Figure 24:
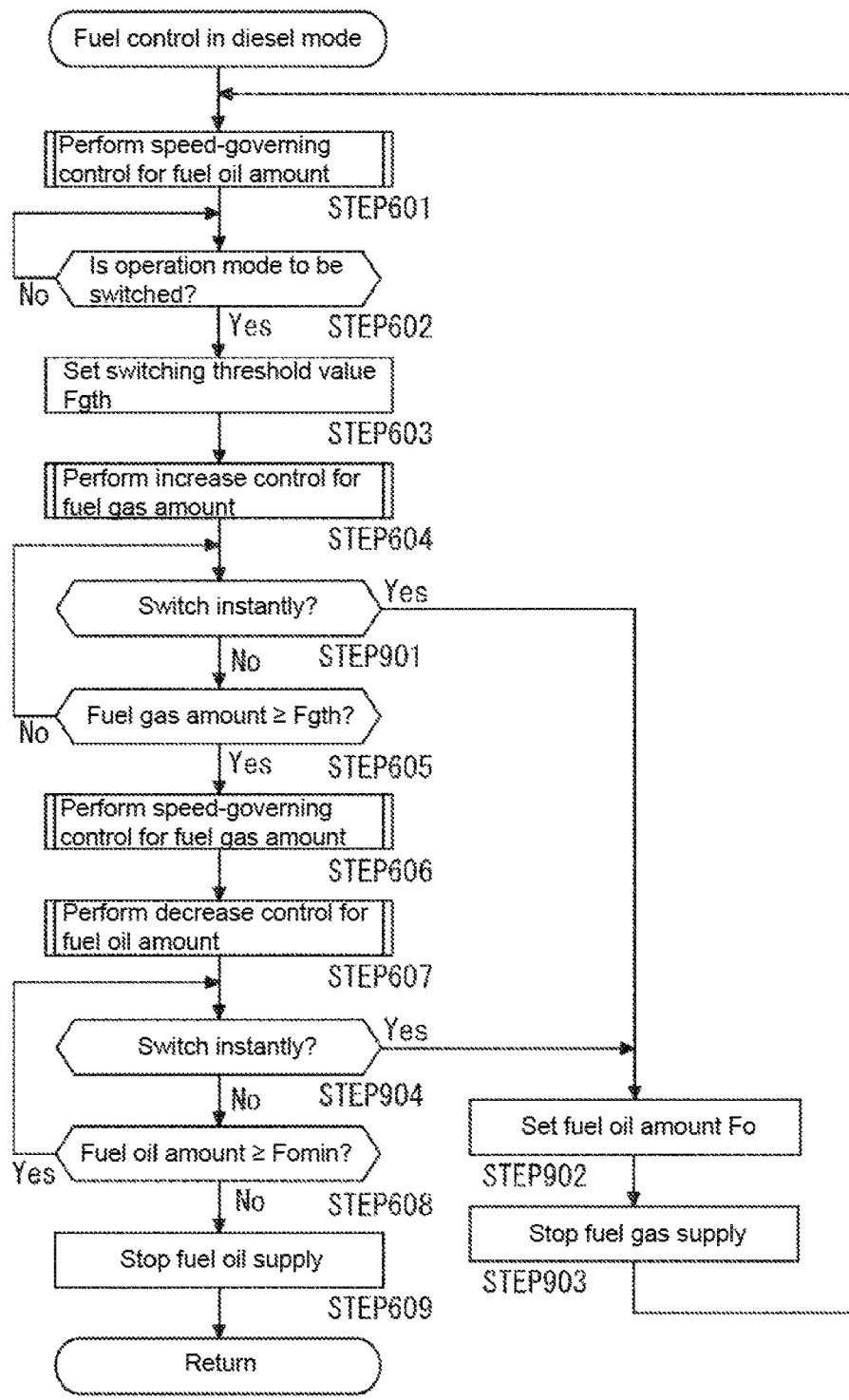
FIG. 24 A flowchart of a first example showing an operation of a fuel supply control by an engine controlling device during the diesel mode.

With reference to FIG. 24, the following describes a first example of the fuel control in the diesel mode. The fuel control of the present example is based on the control operation shown in FIG. 17 to FIG. 19, as hereinabove described. Therefore, the control steps that are identical to the above-described basic control operations (see FIG. 17 to FIG. 19) are given the same reference symbols and the detailed description for these steps are omitted.

As shown in the flowchart of FIG. 24, in the present example, unlike the above-described basic control operations, the engine controlling device 73, when determining to switch the operation mode of the engine device 21 to the gas mode (Yes in STEP 602), sets the switching threshold value Fgth and then starts increase control of the fuel gas supply amount (STEP 603 to STEP 604). Then, the engine controlling device 73 determines whether to execute instant switching to the diesel mode (STEP 901). When the instant switching to the diesel mode is to be executed (Yes in STEP 901), the fuel oil supply amount Fo is set and the fuel gas supply is stopped (STEP 902 to STEP 903), and executes speed-governing control of the fuel oil supply amount (STEP 601).

Further, after the start of the increase control of the fuel gas supply amount, the engine controlling device 73 determines whether to perform instant switching to the diesel mode (STEP 904), even after the fuel gas supply amount reaches or surpasses the switching threshold value Fgth (Yes in STEP 605) and the control of the fuel gas supply is switched to the speed-governing control while the control of the fuel oil is switched to the decrease control (STEP 606 to STEP 607). Then, when the instant switching to the diesel mode is to be executed (Yes in STEP 904), the fuel oil supply amount Fo is set and the fuel gas supply is stopped (STEP 902 to STEP 903), and executes speed-governing control of the fuel oil supply amount (STEP 601).

Through the operation following the flowchart of FIG. 24, the engine device 21 can respond to the instant switching to the diesel mode, even when the operation mode is switched from the diesel mode to the gas mode. Therefore, even during the switching from the diesel mode to the gas mode, it is possible respond to a situation which requires urgent switching to the diesel mode, and hence stable navigation of the ship can be continued, without an emergency stop.

Figure 25:
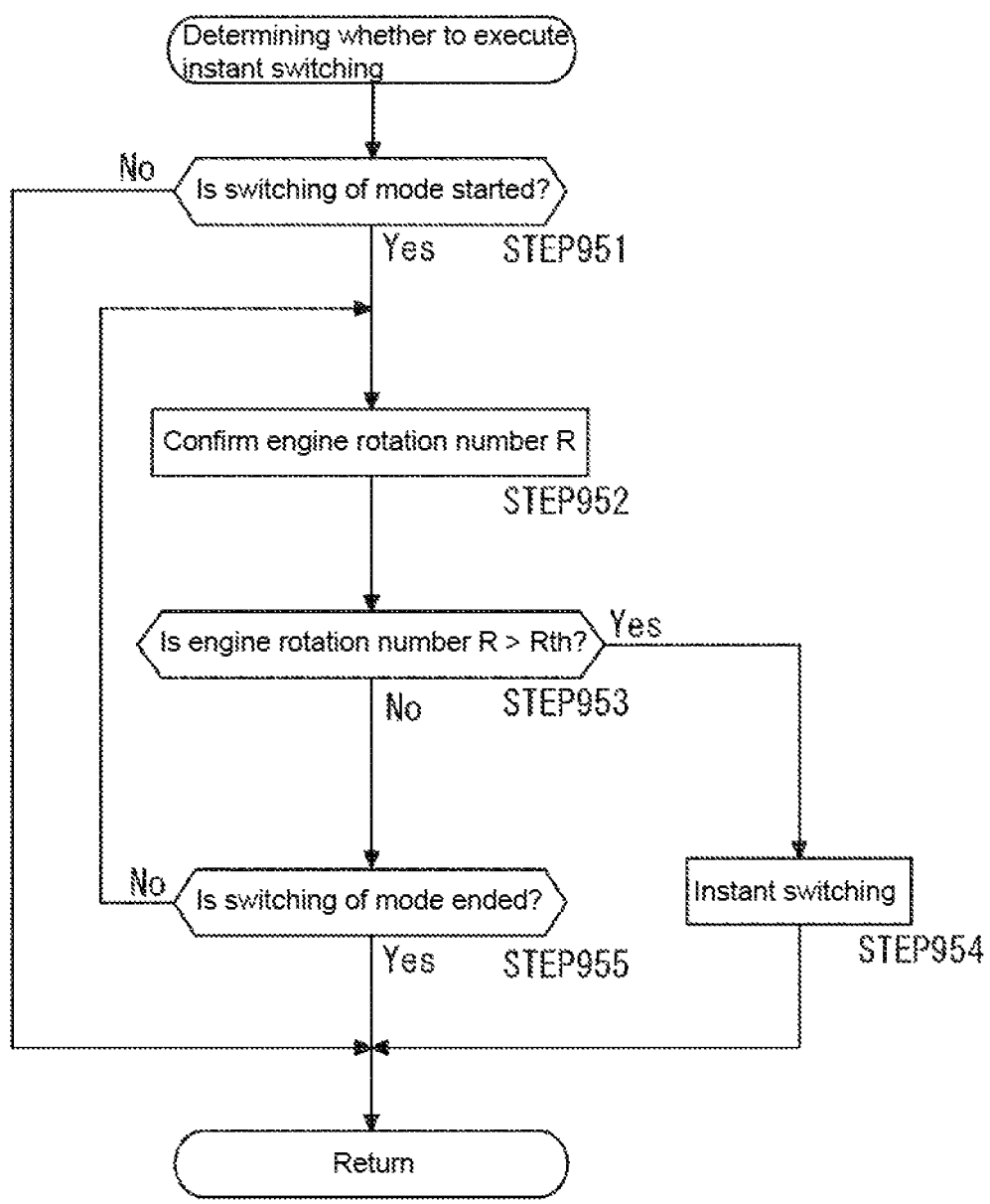
FIG. 25 A flowchart showing a first example of an operation for determining whether to execute the instant switching, by the engine controlling device.
Figure 26:
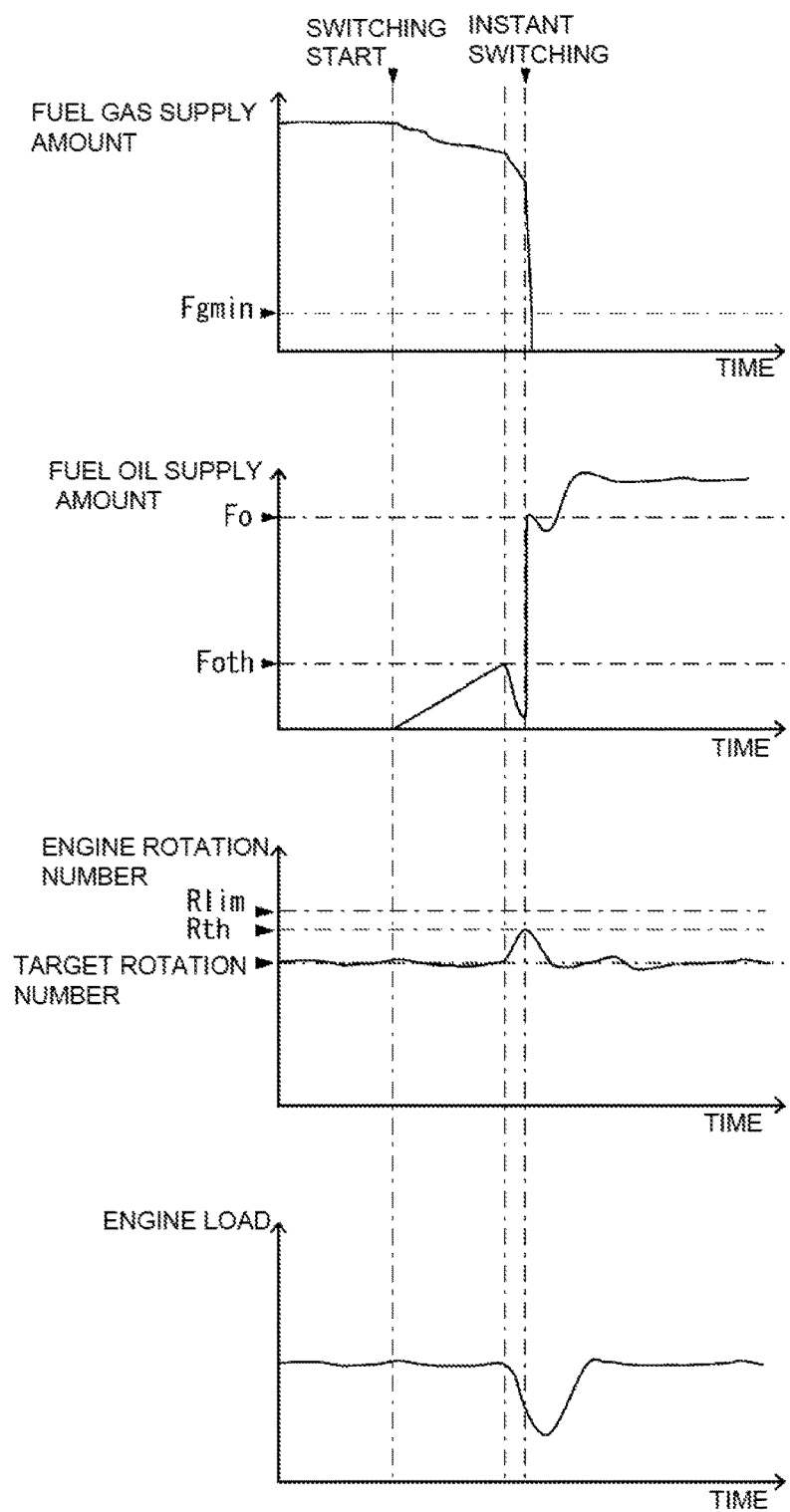
FIG. 26 A timing chart showing a relation between transitions in supply amounts of a fuel gas and a fuel oil, an engine rotation number, and an engine load, when the instant switching is executed at a time of switching to the diesel mode.

Whether to execute the instant switching is determined in STEP 701, STEP 801, and STEP 805 of the above-described first example and the second example of fuel control in the gas mode. The following describes, with reference to FIG. 25 and FIG. 26, a first example of an operation for determining whether to execute the instant switching. FIG. 25 is a flowchart showing the operation of the present example, for determining whether to execute the instant switching. FIG. 26 is a timing chart showing transition of fuels in cases where the instant switching is executed at a time of switching the operation mode of the engine device 21.

As shown in FIG. 25, when switching of the operation mode of the engine device 21 is started (STEP 951), the engine controlling device 73 receives a signal from the engine rotation sensor 20 and confirms the engine rotation number R of the engine device 21 (STEP 952), and compares the engine rotation number with a predetermined rotation number Rth (STEP 953). The predetermined rotation number Rth is set to a value lower than an upper limit engine rotation number Rlim at which the engine device 21 is urgently stopped. Therefore, when the predetermined rotation number Rth is reached, the engine rotation number is determined as to be close to the upper limit engine rotation number Rlim at which the engine device is urgently stopped.

When the engine rotation number R is higher than the predetermined rotation number Rth (Yes in STEP 953), instant switching to the diesel mode is executed (STEP 954). Further, when the engine rotation number R is not more than the predetermined rotation number Rth (No in STEP 953), whether or not the switching of the operation mode is completed is confirmed (STEP 955). If the switching of the operation mode is not completed, the process proceeds to STEP 951. This way, the engine controlling device 73 determines whether to execute the instant switching based on whether or not the engine rotation number R has exceeded the predetermined rotation number Rth, during the switching of the operation mode.

Through the operation following the flowchart of FIG. 25, the engine device 21, at a time of switching the operation from the gas mode to the diesel mode, executes the instant switching upon the engine rotation number R exceeding the predetermined rotation number Rth, as shown in FIG. 26. That is, as shown in FIG. 26, when the engine load fluctuates in the direction of attenuation and as soon as the engine rotation number R exceeds the predetermined rotation number Rth, the fuel oil supply amount Fo is set and the fuel oil is supplied, and then speed-governing control is performed for the fuel oil supply amount, and the fuel gas supply is stopped. This way, the engine rotation number of the engine device 21 can be prevented from reaching the upper limit engine rotation number Rlim, and an emergency stop of the engine device 21 can be avoided. Since the engine rotation number does not rise to a rotation number beyond the upper limit value (overspeed), a ship can stably continue its navigation without an emergency stop of the ship.

Figure 27:
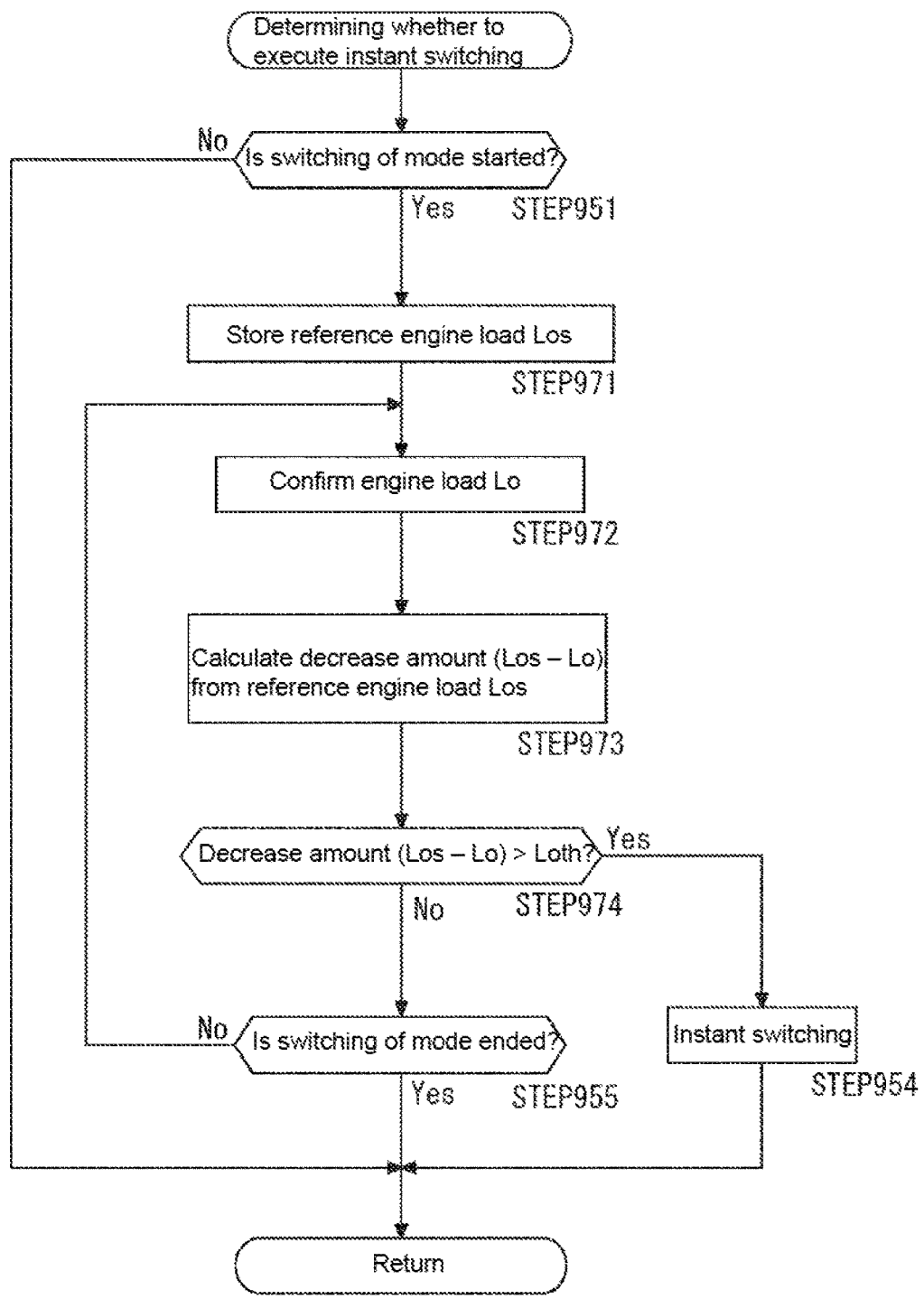
FIG. 27 A flowchart showing a second example of an operation for determining whether to execute the instant switching, by the engine controlling device.
Figure 28:
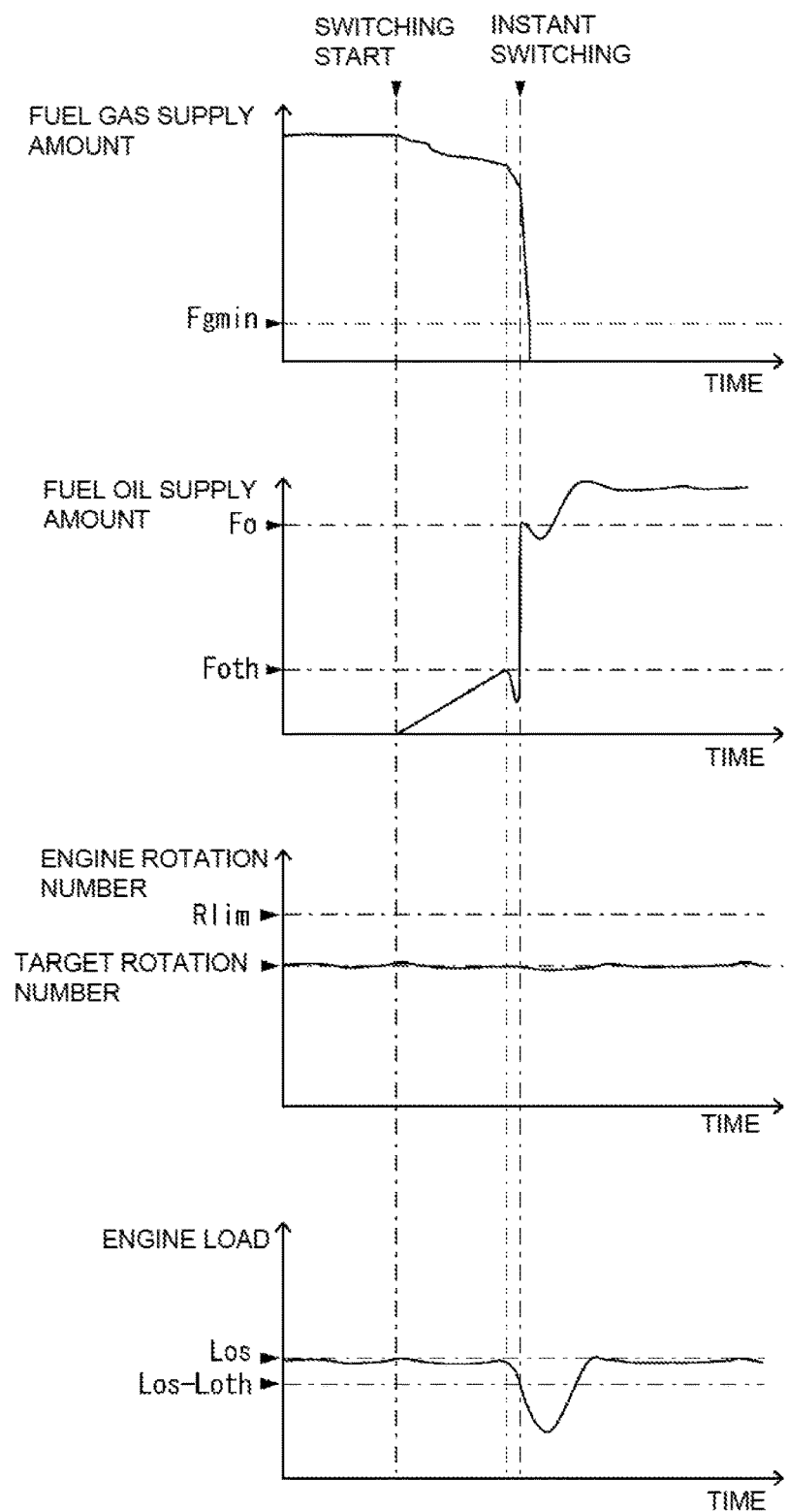
FIG. 28 A timing chart showing a relation between transitions in supply amounts of a fuel gas and a fuel oil, an engine rotation number, and an engine load, when the instant switching is executed at a time of switching to the diesel mode.

With reference to FIG. 27 and FIG. 28, the following describes a second example of an operation for determining whether to execute the instant switching. FIG. 27 is a flowchart showing the operation of the present example, for determining whether to execute the instant switching. FIG. 28 is a timing chart showing transition of fuels in cases where the instant switching is executed at a time of switching the operation mode of the engine device 21. Unlike the above-described first example, in the present example, whether to execute the instant switching is determined based on the engine load of the engine device 21.

As shown in FIG. 27, when switching of the operation mode of the engine device 21 is started (STEP 951), the engine controlling device 73 receives a signal from the load measuring device 19 and confirms the engine load of the engine device 21 at the time of starting the switching, and compares the engine load with a reference engine load Los (STEP 971). Then, after confirming an engine load Lo based on a signal from the load measuring device 19 (STEP 972), the engine controlling device 73 calculates a decrease amount (Los−Lo) from the reference engine load Los (STEP 973), and compares the decrease amount with a predetermined decrease amount Loth (STEP 974). The reference engine load Los is set within a drivable range of rotation numbers lower than the upper limit engine rotation number Rlim at which the engine device 21 is urgently stopped. That is, when the reference engine load Los is reached, the engine rotation number is determined as to be close to the upper limit engine rotation number Rlim at which the engine device is urgently stopped.

Then, the decrease amount (Los−Lo) from the reference engine load Los is greater than the predetermined decrease amount Loth (Yes in STEP 974), the instant switching to the diesel mode is executed (STEP 954). Further, when the decrease amount (Los−Lo) from the reference engine load Los is not more than the predetermined decrease amount Loth (No in STEP 974), whether or not the switching of the operation mode is completed is confirmed (STEP 955). If the switching of the operation mode is not completed, the process proceeds to STEP 972. This way, the engine controlling device 73 determines whether to execute the instant switching based on whether or not the decrease amount (Los−Lo) from the reference engine load Los has exceeded the predetermined decrease amount Loth, during the switching of the operation mode.

Through the operation following the flowchart of FIG. 27, the engine device 21, at a time of switching the operation from the gas mode to the diesel mode, executes the instant switching upon the engine load decrease amount (Los−Lo) exceeding the predetermined decrease amount Loth, as shown in FIG. 28. That is, as shown in FIG. 28, when the engine load fluctuates in the direction of attenuation and as soon as the decrease amount from the reference engine load Los exceeds the predetermined decrease amount Loth, the fuel oil of the set fuel oil supply amount Fo is supplied and then speed-governing control is performed for the fuel oil supply amount, and the fuel gas supply is stopped. This way, since the engine rotation number of the engine device 21 will not rise to a rotation number beyond the upper limit value (overspeed), an emergency stop of the engine device 21 can be avoided. Therefore, a ship can stably continue its navigation without an emergency stop of the ship.

Figure 29:
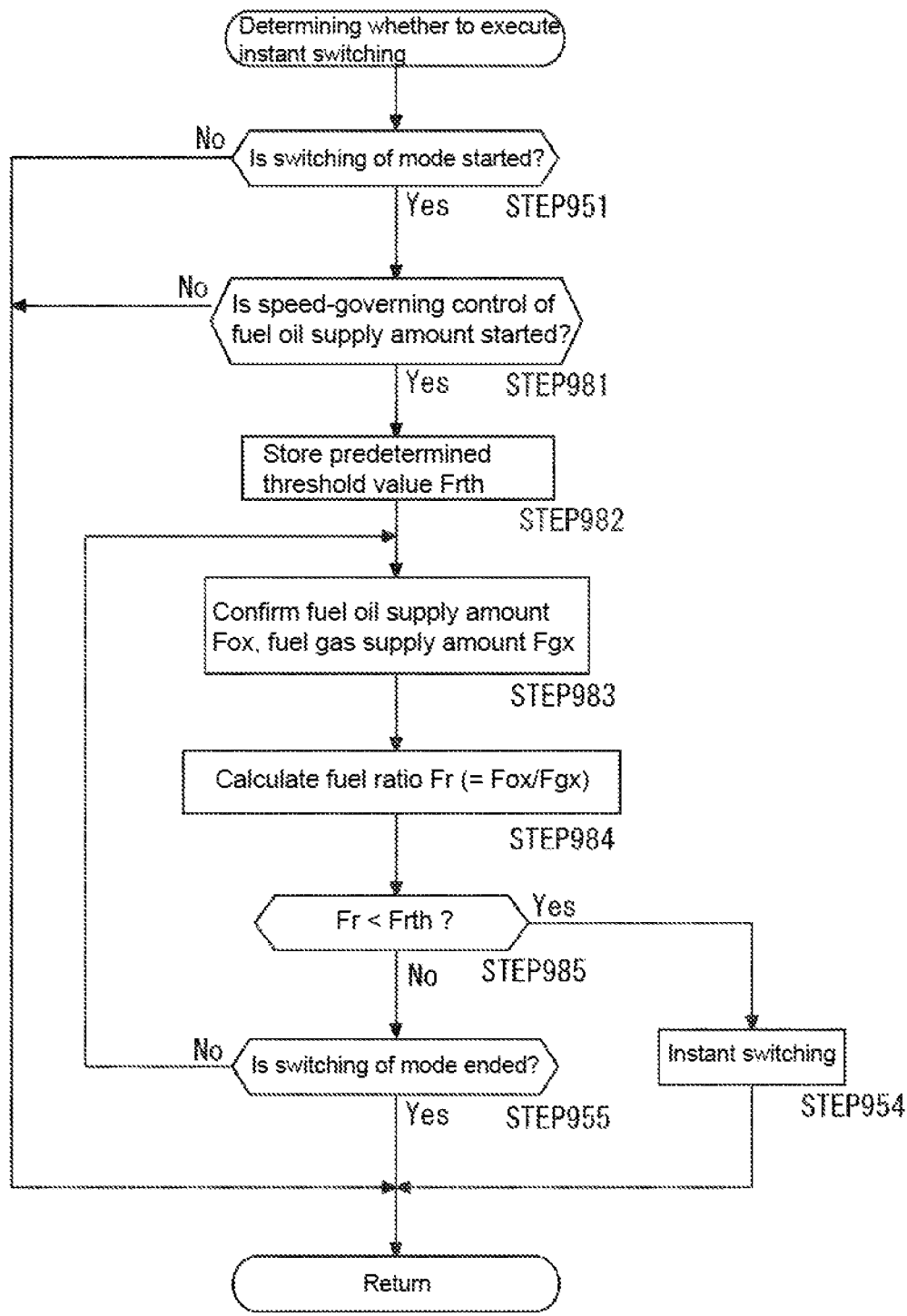
FIG. 29 A flowchart showing a third example of an operation for determining whether to execute the instant switching, by the engine controlling device.

With reference to FIG. 29, the following describes a third example of an operation for determining whether to execute the instant switching. FIG. 29 is a timing chart showing transition of fuels in cases where the instant switching is executed at a time of switching the operation mode of the engine device 21. Unlike the above-described first example, in the present example, whether to execute the instant switching is determined based on a ratio of the fuel gas supply amount and the fuel oil supply amount. Further, the operation of the present example for determining whether to execute the instant switching is executed in the above-described STEP 805 of the fuel control in the gas mode in the second example.

As shown in FIG. 29, at a time of switching from the gas mode to the diesel mode (Yes in STEP 951), when the engine controlling device 73 starts the speed-governing control of the fuel oil supply amount (Yes in STEP 981), a predetermined threshold value Frth which serves as a reference for determining whether to execute the instant switching is calculated and stored, based on a fuel oil supply amount Fos and a fuel gas supply amount Fgs at the time of starting the speed-governing control (STEP 982). Then, the engine controlling device 73, when confirming a fuel oil supply amount Fox and a fuel gas supply amount Fgx (STEP 983), calculates a fuel ratio Fr (=Fox/Fgx) of the fuel oil supply amount Fox to the fuel gas supply amount Fgx (STEP 984), and compare the ratio with the predetermined threshold value Frth (STEP 985).

For example, this threshold value Frth is a value (K×Fos/Fgs) obtained by multiplying, by a coefficient K (K<1), a fuel ratio Fos/Fgs of the fuel oil supply amount Fos to the fuel gas supply amount Fgs at the time of starting the speed-governing control for the fuel oil supply amount, and is set within a drivable range of rotation numbers lower than the upper limit engine rotation number Rlim at which the engine device 21 is urgently stopped. That is, when the predetermined threshold value Frth is reached, the engine rotation number is determined as to be close to the upper limit engine rotation number Rlim at which the engine device is urgently stopped.

Then, when the fuel ratio Fr is smaller than the predetermined threshold value Frth (Yes in STEP 985), the instant switching to the diesel mode is executed (STEP 954). Further, when the fuel ratio Fr is not less than the predetermined threshold value Frth (No in STEP 985), whether or not the switching of the operation mode is completed is confirmed (STEP 955). If the switching of the operation mode is not completed, the process proceeds to STEP 983. This way, the engine controlling device 73 determines whether to execute the instant switching based on whether or not the fuel ratio Fr has exceeded the predetermined threshold value Frth, during the switching of the operation mode. This way, the engine rotation number of the engine device 21 can be prevented from reaching the upper limit engine rotation number Rlim, and an emergency stop of the engine device 21 can be avoided. Therefore, a ship can stably continue its navigation without an emergency stop of the ship.

The above-described operation for determining whether to execute the instant switching is described as an operation to be performed at a time of executing switching from the gas mode to the diesel mode; however, in cases where the determination is based on the engine rotation number or the engine load as in the first example and the second example, the operation for determining whether to execute the instant switching is also performed at a time of switching from the gas mode to the diesel mode.

The structure of each of the portions is not limited to the illustrated embodiment, but can be variously changed within a scope which does not deflect from the scope of the present invention. Further, the engine device of the present embodiment can also be applied to structures other than the propulsion/electric power generating mechanism described above, such as a generator device for supplying electric power to an electric system in a ship hull and a structure as a drive source in the land-based power generating facility. Further, in the engine device of the present invention, although the ignition method is based on the micro pilot injection method, it may be configured to perform spark ignition in the sub chamber.

REFERENCE SIGNS LIST 1 ship
2 ship hull
4 funnel
5 propeller
9 propeller shaft
11 engine room
12 propulsion/electric power generating mechanism
17 supplied-air bypass passage
18 exhaust bypass passage
19 load measuring device
20 engine rotation sensor
21 engine device (dual-fuel engine)
22 speed reducer
23 shaft-driven generator
24 output shaft (crank shaft)
25 cylinder block
26 cylinder head
36 cylinder
37 intake port
38 exhaust port
39 pressure sensor
40 head cover
41 gas manifold (gaseous fuel pipe)
42 fuel oil pipe (liquid fuel pipe)
43 side cover
44 exhaust manifold
45 thermal insulation cover
46 cooling water pipe
47 common-rail (pilot fuel pipe)
48 exhaust gas relay pipe
49 turbocharger
51 intercooler
53 cooling water pump
54 pilot fuel pump
55 lubricating oil pump
56 fuel oil pump
57 oil pan
58 lubricating oil cooler
59 lubricating oil strainer 67 intake manifold
79 main fuel injection valve
80 intake valve
81 exhaust valve
82 pilot fuel injection valve
89 combustion injection pump
98 gas injector

The invention claimed is:

1. An engine device comprising:
  an intake manifold configured to supply air into a cylinder;
  an exhaust manifold configured to output exhaust gas from the cylinder;
  a gas injector configured to mix a gaseous fuel with the air supplied from the intake manifold; and
  a main fuel injection valve configured to inject a liquid fuel into the cylinder for combustion, the gas injector and the main fuel injection valve being provided to each of a plurality of the cylinders, and the engine device being configured to drive in either a gas mode in which the gaseous fuel is supplied into the cylinder or a diesel mode in which the liquid fuel is supplied into the cylinder,
  wherein, at a time of switching an operation mode from one to another between the gas mode and the diesel mode, an instant switching to the diesel mode is executed when an engine rotation number is determined to approach an upper limit value which leads to an emergency stop of the engine device.

2. The engine device according to claim 1, wherein, at the time of switching the operation mode, the instant switching to the diesel mode is executed when a measured engine rotation number exceeds a predetermined rotation number lower than an upper limit engine rotation number which leads to the emergency stop.

3. The engine device according to claim 1, wherein, at the time of switching the operation mode, the instant switching to the diesel mode is executed when a decrease amount in an engine load from a switching start time becomes greater than a predetermined amount.

4. The engine device according to claim 1, wherein, at the time of switching the operation mode, the instant switching to the diesel mode is executed when a ratio of a liquid fuel supply amount to a gaseous fuel supply amount becomes less than a predetermined value.

5. The engine device according to claim 1, wherein, at a time of instantly switching from the gas mode to the diesel mode, a supply amount of a liquid fuel after the switch to the diesel mode is set based on the engine rotation number or an engine load, and supply of the liquid fuel is started.

6. The engine device according to claim 1, wherein:
  at a time of switching an operation mode from one to another between the gas mode and the diesel mode, a supply amount of a first fuel to be supplied in a post-switching operation mode is increased to a switching threshold value through an increase control which monotonously increases the supply amount, and then controlled by a speed-governing control based on an engine rotation number; and
  the switching threshold value is set based on the engine rotation number or an engine load.

* * * * *